Figure 1:
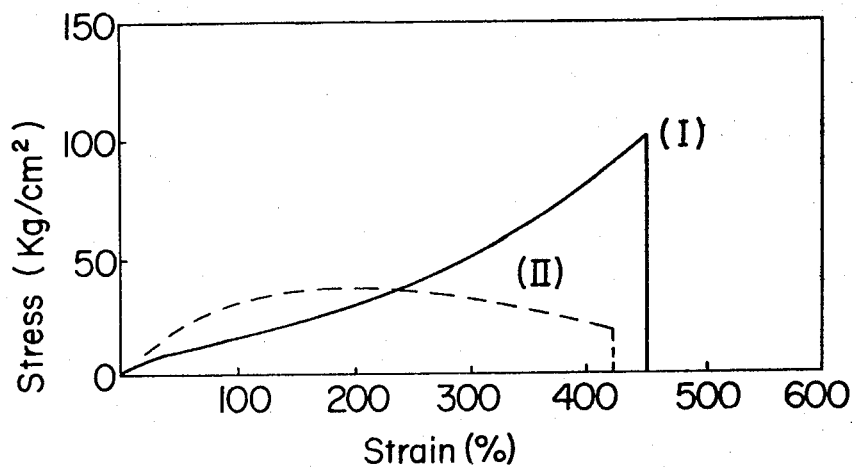

United States Patent
Furukawa et al.

[11] 3,846,389
[45] Nov. 5, 1974

[54] PRODUCTION OF ALTERNATING COPOLYMERS OF CONJUGATED DIENES AND CONJUGATED POLAR VINYL MONOMERS

[76] Inventors: Junji Furukawa, No. 64, Iori-cho, Kitashirakawa, Sakyo-ku, Kyoto; Yutaka Iseda; Kazuo Haga, both of No. 2800-1, Ogawa-Higashi-cho, Kodaira, Tokyo; Nobuyuki Kataoka, No. 25-7, 4-chome, Nakaochiai, Shinjuku-ku, Tokyo, all of Japan

[22] Filed: Mar. 28, 1972

[21] Appl. No.: 345,771

Related U.S. Application Data

[60] Division of Ser. No. 103,178, Dec. 31, 1970, , which is a continuation-in-part of Ser. No. 740,342, June 26, 1968, abandoned.

[30] Foreign Application Priority Data
Mar. 28, 1968 Japan............................... 43-20335

[52] U.S. Cl................ 260/83.5, 260/82.5, 260/82.3
[51] Int. Cl. .......................... C08d 1/14, C08d 1/56
[58] Field of Search................................... 260/83.5

[56] References Cited
UNITED STATES PATENTS
3,773,854   11/1973   Furakawa et al.................. 260/82.5

*Primary Examiner*—Joseph L. Schofer
*Assistant Examiner*—William F. Hamrock
*Attorney, Agent, or Firm*—Stevens, Davis, Miller & Mosher

[57] ABSTRACT

Novel alternating copolymers of conjugated dienes and conjugated polar vinyl monomers, wherein the conjugated diene unit is connected in a trans-1,4 form and the conjugated polar vinyl monomer unit and the conjugated diene unit are bonded alternately, are produced efficiently by copolyermizing these monomers in a non-aqueous medium at rather low temperature by using a catalyst system prepared by admixing a selected transition metal compound and an organoaluminum halide in the presence of the polar vinyl monomer or another selected Lewis base. The alternating copolymer here obtained has a regular structure, on this account, for example, the butadiene/acrylonitrile elastic alternating copolymer can be oriented and crystallized under a highly stretched condition.

17 Claims, 11 Drawing Figures

Infrared Dichroism of Elongated (15 times) Alternating BD-AN Copolymer

PRODUCTION OF ALTERNATING COPOLYMERS OF CONJUGATED DIENES AND CONJUGATED POLAR VINYL MONOMERS

This is a division of application Ser. No. 103,178, filed 12-31-70.

Which is a Continuation-In-Part application of our earlier filed patent application, Ser. No. 740,342 filed June 26, 1968.

The present invention relates to alternating copolymers of conjugated dienes and conjugated polar vinyl monomers and a method of producing such alternating copolymers.

Many of copolymers of conjugated dienes and conjugated polar vinyl monomers are important commercially. Particularly, butadiene/acrylonitrile copolymer occupies an important position in rubber industry. These copolymers are known to be random copolymers produced by using free-radical initiators. U.S. Pat. No. 1,973,000 describes a method of producing these random copolymers. These random copolymers have various characteristics and defects. For example, if an explanation will be made with respect to a butadiene/acrylonitrile copolymer as an embodiment, the most characteristic feature of this copolymer is a high oil resistance and this is based on acrylonitrile unit in the copolymer. On the other hand, if the acrylonitrile content in the copolymer becomes larger, for example, impact resilience of the copolymer lowers and the gel content increases. Furthermore, such a random copolymer cannot be oriented and crystallized under highly stretched condition because of irregularity in its structure.

The inventors have succeeded in synthesizing novel type alternating copolymers having highly regular structure by using a novel copolymerization process and the efficient production of the alternating copolymers, can considerably decrease the above described defects and further improve characteristics of the copolymers in the past. For example, the butadiene/acrylonitrile alternating copolymer can be oriented and crystallized under a highly stretched condition because of its regular structure. Furthermore, mechanical properties such as impact resilience, tensile strength, elongation of the alternating copolymer are superior to those of the random one both in original state and oil swollen state, and anti-swelling property of the former copolymer is as good as the latter copolymer.

The present invention provides such novel alternating copolymers and a novel alternating copolymerization process.

Figure 2:
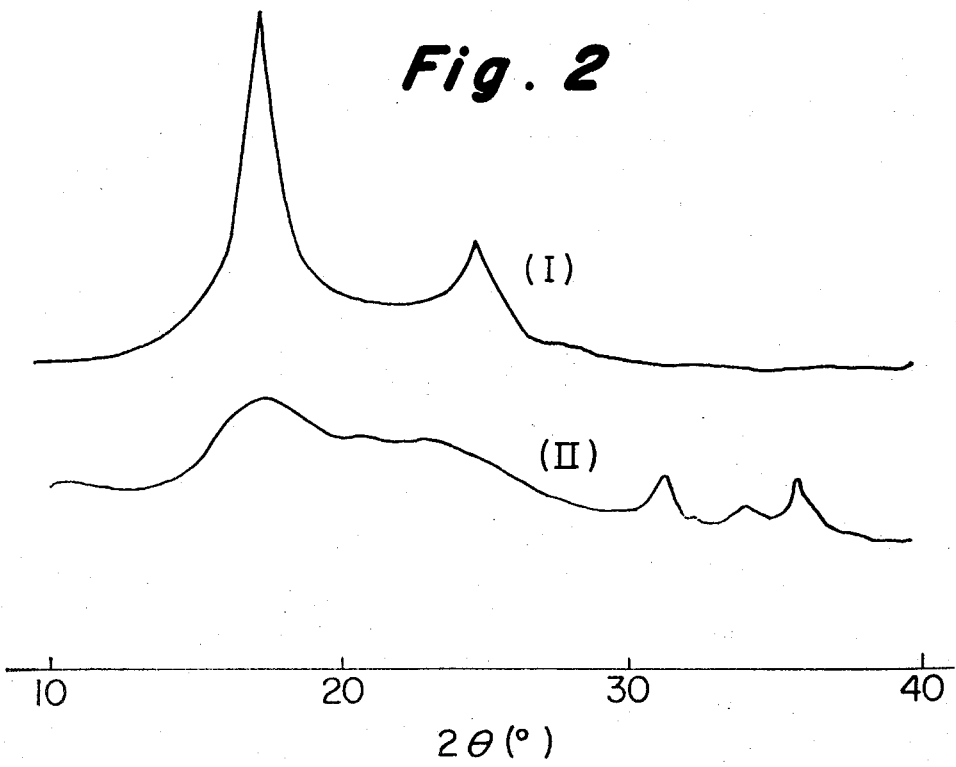
Figure 3:
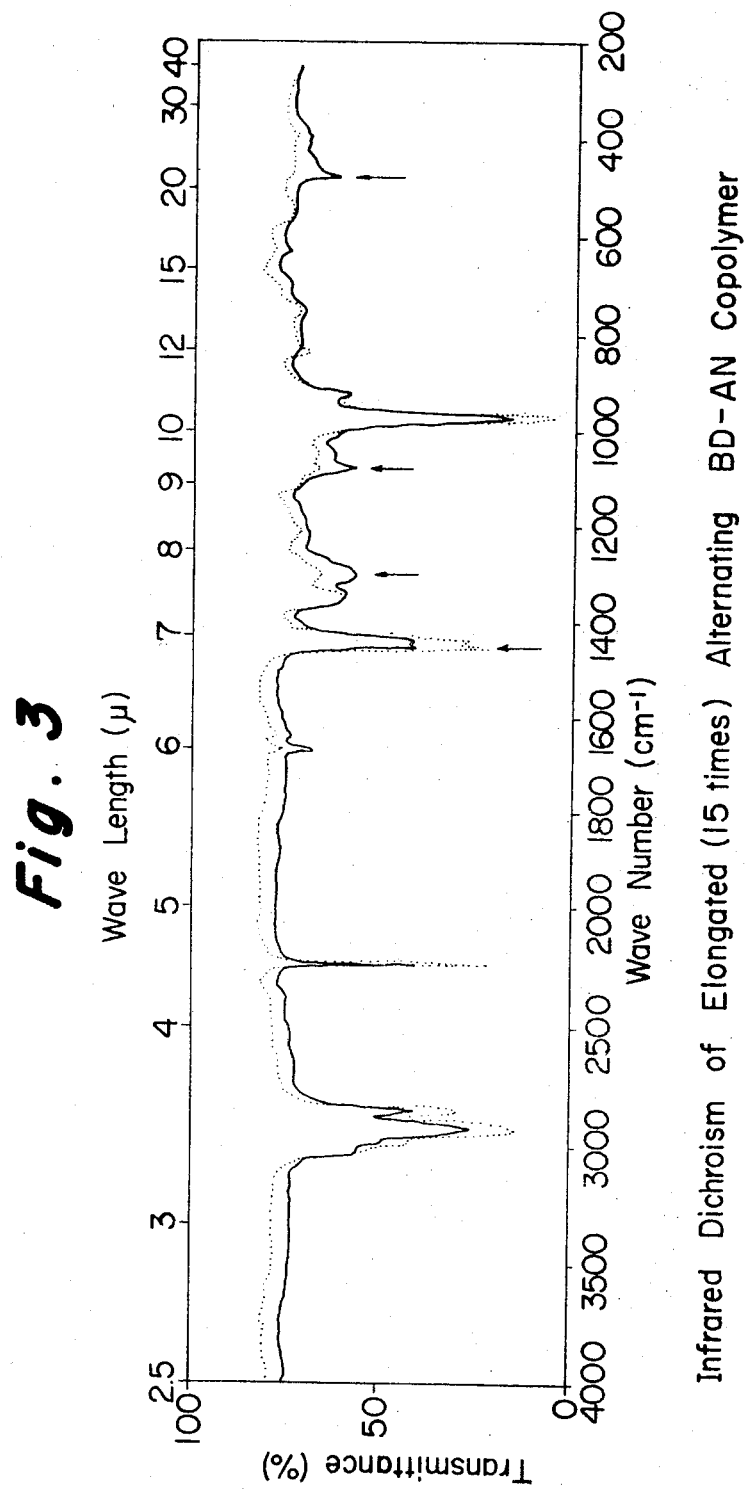
Figure 4:
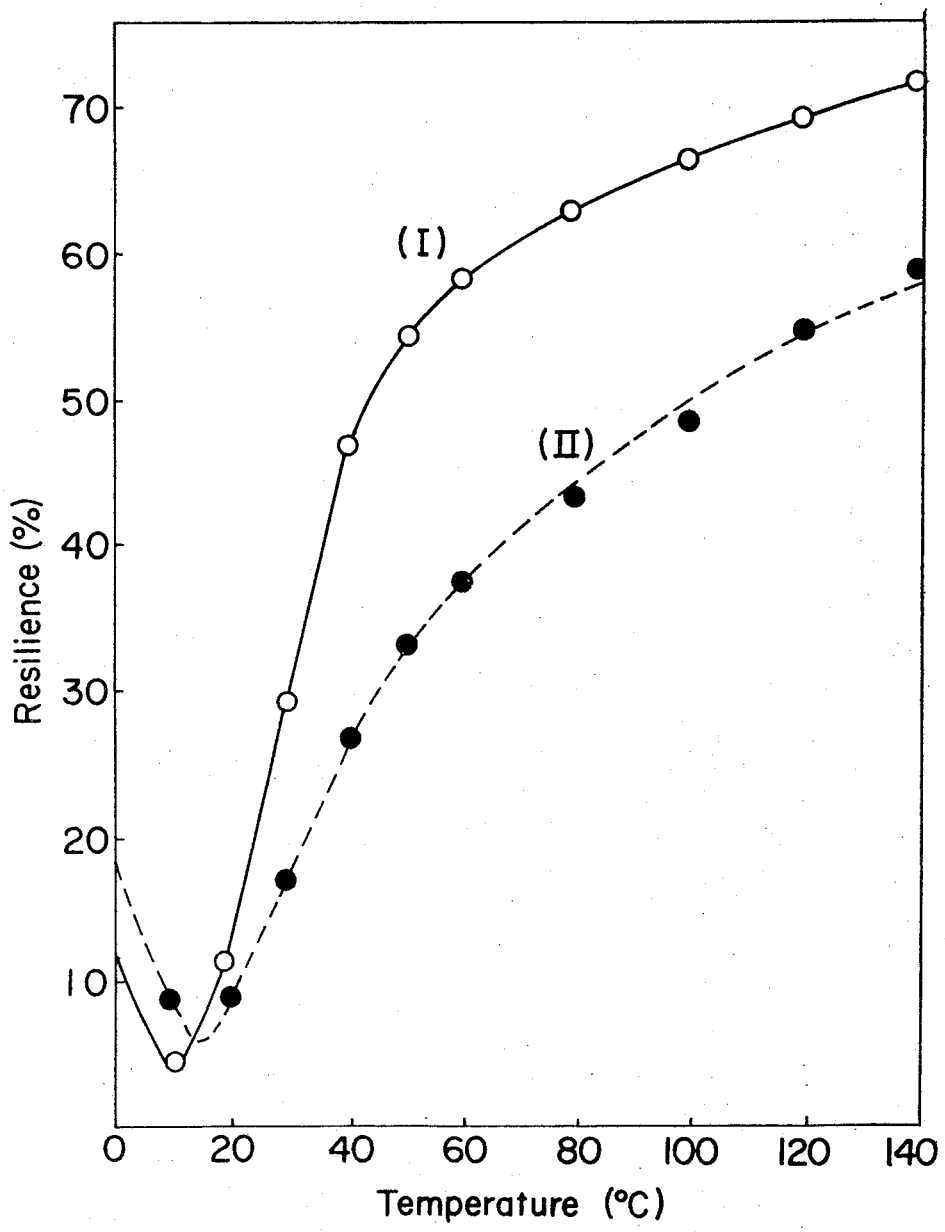

In the novel copolymers, a conjugated diene unit and a conjugated polar vinyl monomer unit are bonded alternately and the diene unit is connected in a trans-1,4 form. For example, in the butadiene/acrylonitrile alternating copolymer, the degree of alternation is measured to be more than 92 percent of butadiene/acrylonitrile dyad content and the micro-structure of butadiene unit is estimated to be more than 90 percent of trans-1,4 form. This alternating copolymer can be oriented and crystallized under a highly stretched condition. These phenomena can be ascertained apparently, by measuring a stress-strain curve, X-ray diffraction diagram, and IR dichroism of a stretched film of the copolymer, as shown in FIGS. 1, 2, and 3, respectively. The stress-strain curve of the alternating copolymer (curve (I) in FIG. 1) indicates much increasing stress under a highly stretched condition like natural rubber, X-ray diffraction diagram of the alternating copolymer shows sharp peaks assignable to its orientation and crystallization under a highly stretched condition. The appearance of IR dichroism and crystalline bands of the alternating copolymer are found under a highly stretched state, and these facts shows the orientation and crystallization under a highly stretched condition. On the other hand, in a butadiene/acrylonitrile 1:1 random copolymer produced in a process wherein a free-radical initiator is used, the degree of alternation is less than 85 percent and the micro-structure of butadiene unit is about 85 percent of trans-1,4 form. This random copolymer cannot be oriented and crystallized under a highly stretched condition on account of irregularity in the structure of the copolymer chain. Moreover, the impact resilience of the alternating copolymer is considerably superior to that of the conventional random copolymer, for example, the measured value of the former at 60°C is 1.6 times that of conventional random copolymer as shown in FIG. 4. Furthermore, according to this invention, it is possible to produce a gel-free alternating copolymer by selecting the copolymerization conditions such as the composition and the concentration of the catalyst and those of the monomer. In addition, the alternating copolymer has an improved oil resistance, a considerably high tensile strength and a remarkably excellent processability and, further, improved heat resistance and flexibility and a decreased permanent compression set. Compounding formula and mechanical properties of the cured elastomers for both the alternating and the random butadiene/acrylonitrile copolymers are summarized in Tables I and II. The alternating copolymer is the same as that in Example 1.

Table I

| Compounding Formula for Butadiene/Acrylonitrile Copolymer | |
|---|---|
| Materials | Parts by Weight |
| Polymer | 100 |
| Carbon Black SRF | 45 |
| Zinc Oxide | 5 |
| Stearic Acid | 1 |
| Antioxidant PBNA | 1 |
| Accelerator NOBS sp. | 1 |
| Sulfur | 1.5 |

Table II

Mechanical Properties of Cured Butadiene/Acrylonitrile Copolymers

| | Alternating | | Random | |
|---|---|---|---|---|
| | Cured Time (min), at 145°C | | | |
| | 60' | 90' | 60' | 90' |
| At Room Temperature | | | | |
| Hardness (JIS Spring) | 73 | 74 | 86 | 85 |
| Modulus at 100% (Kg/cm$^2$) | 43 | 43 | 105 | 114 |
| Tensile Strength(Kg/cm$^2$) | 237 | 243 | 194 | 205 |
| Ultimate Elongation (%) | 400 | 400 | 210 | 200 |
| At 110°C | | | | |
| Tensile Strength(Kg/cm$^2$) | 58 | — | 50 | — |
| Ultimate Elongation (%) | 340 | — | 210 | — |
| After the Immersion in Oil[a] | | | | |
| Change in Weight (%) | 12 | 12 | 12 | 12 |
| Tensile Strength(Kg/cm$^2$) | 147 | 153 | 97 | 112 |
| Ultimate Elongation (%) | 300 | 290 | 150 | 160 |

[a] In ASTM reference fuels B (Isooctane/Toluene: 70/30) for 48 hours at room temperature.

As mentioned above, the novel alternating copolymers have excellent properties based on the highly regular alternating structure of the copolymers.

British Patents 1,056,236 and 1,089,279 have proposed a process of producing alternating copolymers of α-olefins and conjugated polar vinyl monomers. However, these alternating copolymers can be neither orientated nor crystallized and are not useful commercially in view of the physical properties and, furthermore, require a very large amount of catalyst for the production. British Patent 1,23,724 and French Patent 1,487,211 describe a method of producing alternating copolymers of conjugated dienes and conjugated polar vinyl monomers. However, as shown in Comparative Examples 2 and 4, a method using organoaluminum halide alone as a catalyst only affords a gel-rich copolymer in an extremely low yield. On the other hand, a gel-free alternating copolymer can be produced in a high yield under the same condition in the process according to this invention as typically shown in Example 1. Nowlin et al. (U.S. Pat. Nos. 2,910,461 and 3,152,089), describe olefin polymerization processes using conventional Ziegler-type catalysts prepared by admixing catalyst components in a hydrocarbon medium and using specific Ziegler-type catalysts prepared by admixing catalyst components in the presence of organic peroxides. These patent specifications also include a process of copolymerizing conjugated diene and conjugated polar vinyl monomers. However, as shown in Comparative Examples 1, and 3, a conventional Ziegler-type catalyst prepared in a hydrocarbon medium scarcely affords a polymer. On the other hand, gel-free alternating copolymers can be produced in a high yield by using special catalyst systems according to the present invention, wherein the catalyst system is prepared by admixing catalyst components in the presence of polar vinyl monomers or other selected Lewis bases at rather low temperature and the polymerization is carried out at rather low temperature as typically shown in Example 1.

One aspect of the present invention consists in a method of producing alternating copolymers of conjugated dienes and conjugated polar vinyl monomers, wherein the conjugated diene unit and the conjugated polar vinyl monomer unit are bonded alternately, which comprises copolymerizing a conjugated diene having 4 to 10 carbon atoms and a conjugated polar vinyl monomer selected from the group consisting of acrylonitrile, methacrylonitrile, methyl acrylate, ethyl acrylate, propyl acrylate, butyl acrylate, methyl methacrylate, and ethyl methacrylate, the molar ratio of said conjugated diene to said polar vinyl monomer being 1:10 to 10:1 at a temperature of −78°C to 50°C, under the monomer gas at or without an inert gas, at a pressure from one determined by vapor pressure in the reaction system to 50 atm. in a non-aqueous medium in the presence of catalyst prepared from a component (A): at least one transition metal compound soluble in the monomer solution selected from the group consisting of halides, alkoxides, acetylacetonates, and salts of carboxylic acids of metals and oxymetals of the Group IV-b and V-b in the Periodic Table and a component (B): an aluminum-containing component selected from the group consisting of aluminum compounds having the general formulae $R_2AlX$, $R_3Al_2X_3$, and $RAlX_2$ and a combination of two or more aluminum compounds having the general formulae $R_2AlX$, $R_3Al_2X_3$, $RAlX_2$, $R_3Al$, and $AlX_3$ wherein R represents a hydrocarbon radical selected from the group consisting of alkyl radicals having 1 to 10 carbon atoms and X represents a halogen radical selected from the group consisting of $Cl$ and $Br$ atoms, and wherein the ratio of the total number of the hydrocarbon radicals to the total number of halogen atoms in said aluminum-containing component is a positive number not greater than 2.0, and R and X in the aluminum compounds constituting said component (B) may be the same or different, said catalyst being prepared at a temperature of −100°C to 20°C after complexing at least one of the components (A) and (B) with a basic organic compound selected from the group consisting of organic nitriles, α,β-unsaturated carboxylic acid esters, benzoates, phenyl alkyl tertiary amines and thiophene avoiding direct contact of the components (A) with (B), the transition metal atom in the component (A) being $1:10^5$ to $1:1$ g-atom based on 1 g-atom of $Al$ in the component (B), the total amount of metal atoms in the components (A) and (B) being $1:10^4$ to $1:10$ g-atom based on 1 mole of the total amount of fed monomers.

The conjugated dienes to be used in the present invention have 4 to 10 carbon atoms and the typical examples are butadiene, pentadiene, hexadiene, isoprene, 2,3-dimethyl butadiene and phenyl butadiene. Among them, butadiene is preferable.

The conjugated polar vinyl monomers to be used in the present invention include acrylonitrile, methacrylonitrile, methyl acrylate, ethyl acrylate, propyl acrylate, butyl acrylate, methyl methacrylate, and ethyl methacrylate. Among them, acrylonitrile, methyl methacrylate and methyl acrylate are preferable.

As combinations of the dienes with the monomers, mention may be made of butadiene/acrylonitrile, butadiene/methyl acrylate, butadiene/methyl methacrylate, butadiene/ethyl acrylate, pentadiene/acrylonitrile, pentadiene/methyl acrylate, isoprene/acrylonitrile, isoprene/methyl acrylate, etc. Among them, butadiene/acrylonitrile, butadiene/methyl methacrylate and butadiene/methyl acrylate are preferable, and particularly butadiene/acrylonitrile is most preferable.

The molar ratio of the conjugated diene to conjugated polar vinyl monomer to be fed to the reaction system may be selected optionally, but is usually 1:10 to 10:1, preferably 1:3 to 3:1. The monomer feed ratio influences the rate and degree of copolymerization and the like, therefore it is properly selected according to the purpose. For example, in the case of the copolymerization of butadiene with acrylonitrile, increase of the molar ratio of butadiene to acrylonitrile causes increase of the rate and degree of copolymerization.

Feeding methods of the monomers are optional.

The catalytic component (A) to be used in this invention is at least one compound soluble in the monomer solution selected from the group consisting of halides, alcoxides, acetylacetonates, and salts of carboxylic acids of transition metals and oxy-metals of the Group IV-b and V-b in the Periodic Table. Among them, the compounds of vanadium and titanium, soluble in the mixed monomer solution are preferable. The vandium compound soluble in the mixed monomer solution is more preferable.

As said catalytic component (A), mention may be made of vanadyl trichloride, vanadyl tribromide, vanadium tetrachloride, (tert-butoxy) vanadyl dichloride, (di-tert-butoxy) vanadyl chloride, (tri-tert-butoxy) vanadyl, (tri-methoxy) vanadyl, (tri-ethoxy) vanadyl, (tri-propoxy) vanadyl, (tri-isopropoxy) vanadyl, (tri-butoxy) vanadyl, (tri-iso-butoxy) vanadyl, (tri-sec-butoxy) vanadyl, (tri-pentoxy) vanadyl, (tri-isopentoxy) vanadyl, (tri-hexoxy) vanadyl, (tri-2-ethylhexoxy) vanadyl, (tri-tolyloxy) vanadyl, (tri-phenoxy) vanadyl, (tri-cyclohexoxy) vanadyl, vanadyl diacetylacetonate, vanadium triacetylacetonate, vanadyl naphthenate, vanadyl acetate, vanadyl octate, vanadyl oxalate, vanadocene dichloride, tantalum pentaethoxide, tributoxy tantalum dichloride, zirconium tetra-n-butoxide, zirconium tetrachloride, titanium tetrachloride, butoxy titanium trichloride, di-butoxy titanium dichloride, tri-butoxy titanium chloride, tetra-methoxy titanium, tetra-ethoxy titanium, tetra-propoxy titanium, tetra-iso-propoxy titanium, tetra-butoxy titanium, tetraiso-butoxy titanium, tetra-sec-butoxy titanium, tetra-tert-butoxy-titanium, tetra-pentoxy titanium, tetra-phenoxy titanium, oxy titanium diacetylacetonate, titanium acetate, titanium triacetylacetonate, titanium oxalate, and the like and combinations thereof. Among them compounds of vanadium and titanium are preferable. The preferred compounds include vanadyl trichloride, vanadyl tribromide, vanadyl diacetylacetonate, vanadium triacetylacetonate, tri-tert-butoxy vanadyl, tri-ethoxy vanadyl, di-tert-butoxy vanadyl chloride, tert-butoxy vanadyl dichloride, vanadium tetrachloride, tetra-n-butoxy titanium, tetra-isopropoxy titanium, di-n-butoxy titanium dichloride, oxytitanium diacetylacetonate, vanadyl acetate, vanadyl naphthenate, vanadyl oxalate, titanium tetrachloride, titanium acetate, titanium triacetylacetonate, titanium oxalate and combinations thereof. Vanadyl trichloride and vanadyl tribromide are more preferable.

The catalytic component (B) is an aluminum-containing component selected from the group consisting of aluminum compounds having the general formulae $R_2AlX$, $R_3Al_2X_3$, and $RAlX_2$ and a combination of two or more aluminum compounds having the general formulae $R_2AlX$, $R_3Al_2X_3$, $RAlX_2$, $R_3Al$, and $AlX_3$ wherein R represents a hydrocarbon radical selected from the group consisting of alkyl radicals having 1 to 10 carbon atoms and X represents a halogen radical selected from the group consisting of Cl and Br atoms, wherein the ratio of the total number of the hydocarbon radicals to the total number of halogen atoms in the said aluminum-containing component (this ratio is represented as the ratio ($d$)) is a positive number not greater than 2.0, and R and X in the aluminum compounds constituting the said component (B) may be the same or different.

Among the above general formulae, the compounds having the following formulae, $RAlCl_2$ and $R_3AL_2Br_3$, wherein R is an alkyl radical having 1 to 4 carbon atoms, are preferable.

Such catalytic component (B) includes organoaluminum halides and the combinations thereof, a combination of an organoaluminum halide with an aluminum halide, a combination of an organoaluminum with an aluminum halide and a multicombination combined further these combinations. These aluminum compounds are so selected that the ratio ($d$) is a positive number not greater than 2.0.

As these aluminum compounds, mention may be made of ethylaluminum dichloride, ethylaluminum dibromide, ethylaluminum sesquichloride, ethylaluminum sesquibromide, diethylaluminum chloride, methylaluminum dichloride, methylaluminum sesquichloride, isobutylaluminum dichloride, propylaluminum dichloride, propylaluminum sesquichloride, isobutylaluminum dibromide, propylaluminum sesquichloride, isobutylaluminum dibromide, propylaluminum sequichloride, isobutylaluminum sesquichloride, aluminum trichloride, aluminum tribromide, trimethylaluminum, triethylaluminum, tripropylaluminum, triiso-butylaluminum, tri-n-butylaluminum, dimethylaluminum chloride, diethylaluminum bromide, diisobutylaluminum chloride and the like.

The preferable catalytic components B are the aluminum-containing components, wherein the ratio ($d$) satisfies the following requirement.

$0.2 \leq d \leq 1.2$

The preferred components B include ethylaluminum dichloride, ethylaluminum dibromide, methylaluminum dichloride, ethylaluminum sesquichloride, methylaluminum sesquichloride, ethylaluminum sesquibromide, ethylaluminum dichloride/ethylaluminum sesquichloride, triethylaluminum/aluminum trichloride, diethylaluminum chloride/aluminum trichloride, and combination thereof.

The catalysts according to the present invention must be prepared by complexing at least one of the components (A) and (B) with a suitable basic organic compound avoiding direct contact of the component (A) with the component (B) in a hydrocarbon medium. The suitable basic organic compounds include organic nitriles, $\alpha,\beta$-unsaturated carboxylic acid esters, benzoates, phenyl alkyl tertiary amines, thiophene, and the conjugated polar vinyl monomer to be used in the copolymerization, for example, acrylonitrile, methacrylonitrile, acetonitrile, propionitrile, benzonitrile, fumaronitrile, methyl acrylate, ethyl acrylate, methyl methacrylate, butyl methacrylate, methyl benzoate, butyl benzoate, dimethyl aniline, triphenylamine, thiophene, and the conjugated polar vinyl monomer to be used in the copolymerization. Among them, acrylonitrile, methyl methacrylate, dimethyl aniline, and the conjugated polar vinyl monomer to be used in the co-polymerization are preferable.

The catalysts according to the present invention consist of the component (A) and the component (B) and are prepared at a temperature of $-100°C$ to $20°C$, preferably at a temperature of $-78°C$ to $0°C$. Within this range, a lower temperature is preferable.

This invention includes the method of catalyst preparation in the presence of the conjugated polar vinyl monomer to be used in the copolymerization as the said suitable basic organic compound. In this case, such an addition order of monomers and catalyst components that the component (A) and the component (B) are added to the mixture of the conjugated diene and the conjugated polar vinyl monomer in liquid state is preferable.

If at least one of the components (A) and (B) is complexed by the said basic organic compound, the catalytic activity is always high irrespective of addition order as shown in Example 32 in contrast with Comparative Example 1.

The transition metal atom in the component (A) is $1:10^5$ to $1:1$ g-atom based on 1 g-atom of $Al$ in the component (B), preferably 1:200 to 1:3 g-atom.

The ratio of the component (A) to the component (B) influences the rate and degree of copolymerization and the like. For example, in the copolymerization of butadiene with acrylonitrile with use of tri-tert-butoxy vanadyl and a complex of ethylaluminum dichloride with acrylonitrile, the copolymer yield reaches a maximum at a V:$Al$ ratio of about 1:10 and in the range not greater than this ratio decrease of the V:$Al$ ratio causes increase of the degree of polymerization of the resulting copolymer. Therefore the said ratio is properly selected according to the purpose.

A total amount of metal atoms in both the component (A) and (B) is $1:10^4$ to $1:10$ g-atom based on 1 mole of the total fed monomers.

The copolymerization can be carried out both in the absence and the presence of a solvent which does not inhibit the copolymerization reaction.

As such solvents, mention may be made of aromatic hydrocarbons, alicyclic hydrocarbons, aliphatic hydrocarbons, halogenated hydrocarbons and halogenated carbons, for example, tetrachloroethylene, carbon tetrachloride, propane, butane, pentane, hexane, heptane, octane, ligroin, petroleum ether and other petroleum mixed solvents, cyclohexane, benzene, toluene, xylene, dichloromethane, dichloroethane, trichloroethane, butyl chloride, chloroform, chlorobenzene, dichlorobenzene and carbon disulfide and their mixtures.

A ratio of the solvent to the monomers can be selected optionally.

The copolymerization is carried out at a temperature of −78°C to 50°C under a pressure from one determined by vapor pressure in the reaction system to 50 atm.

The copolymerization is usually carried out under the monomer gas with or without an inert gas such as nitrogen gas.

The copolymerization is carried out in the absence of water, air, and other inhibitors for the copolymerization.

After the completion of the copolymerization reaction, conventional after-treatments are carried out to purify and recover the resulting copolymer. These include alcohol precipitation, alcohol washing, alcohol-hydrochloric acid washing, hot water stripping, water-hydrochloric acid washing and the like. After-treatments for the polymers prepared by using catalysts containing Lewis acid may also be used. Furthermore, processes for separating and recovering the catalyst components by dissolving them in the form of soluble complexes may also be used.

The copolymer prepared in the process according to the present invention always have regular alternating structure. However, the sort of the combination of monomer units, degree of polymerization, and gel content influence the properties of the copolymers.

The 1:1 composition, uniformity, trans-1,4 configuration of the diene unit, alternating arrangement of both monomer units, and gel content of the resulting polymers are confirmed by elemental analyses, fractionations with solvents, IR spectra, NMR spectra, composition analyses of the copolymers prepared at various monomer feed ratio, pyrolysis gas chromatography, and the like.

Orientation and crystallization of the alternating copolymer which originates from a high regularity of the polymer chain are confirmed by measuring stress-strain curves of the copolymers, X-ray diffraction diagrams, and IR spectra.

With respect to these points, explanations will be made by exemplifying mainly butadiene/acrylonitrile copolymer.

Figure 5:
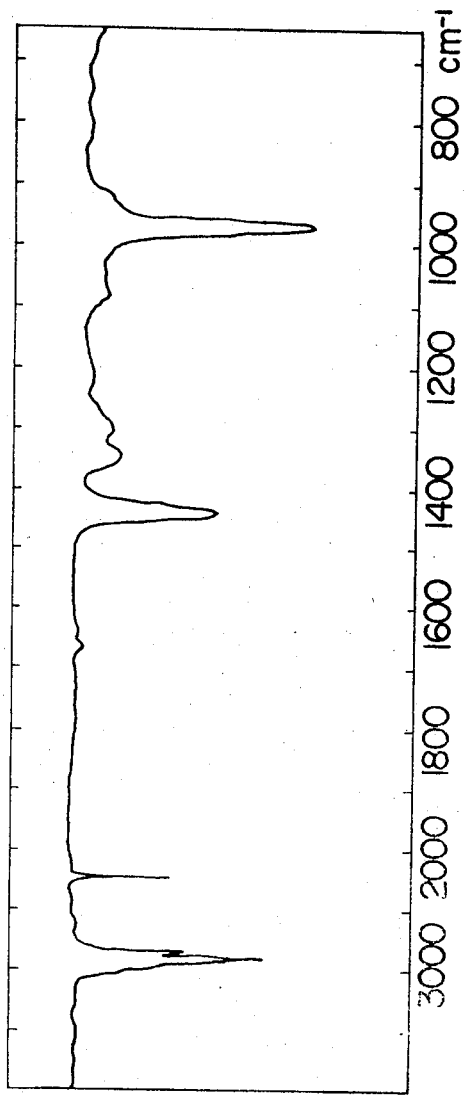
Figure 6:
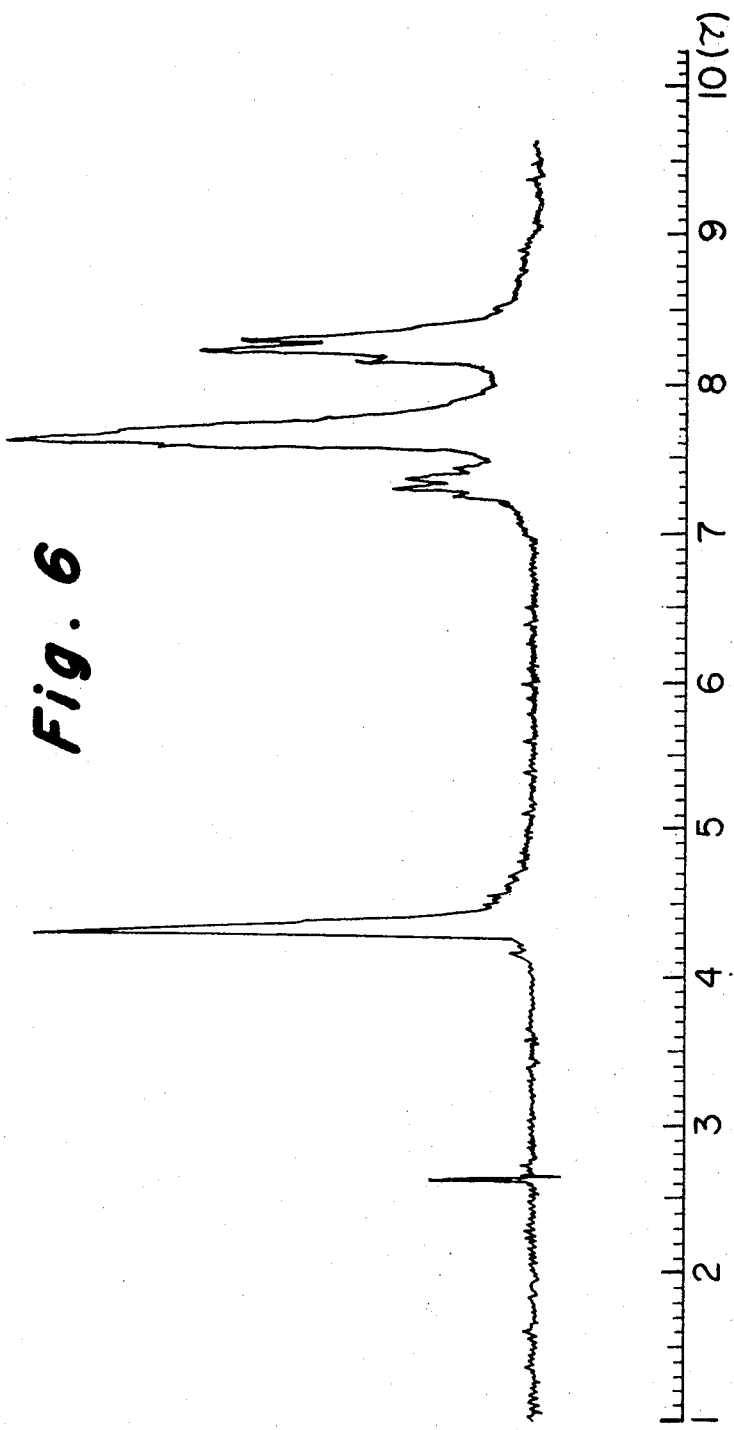
Figure 7:
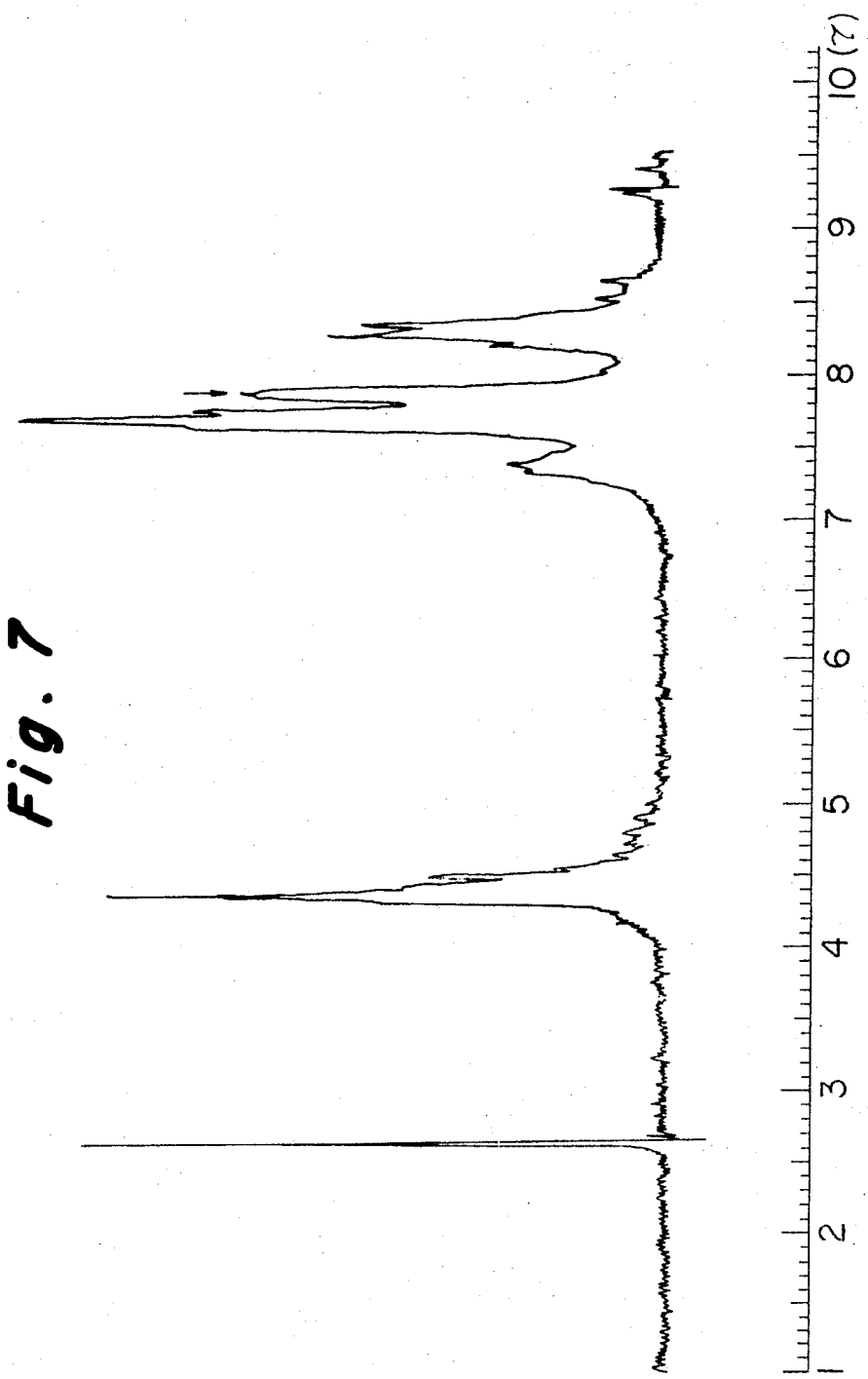
Figure 8:
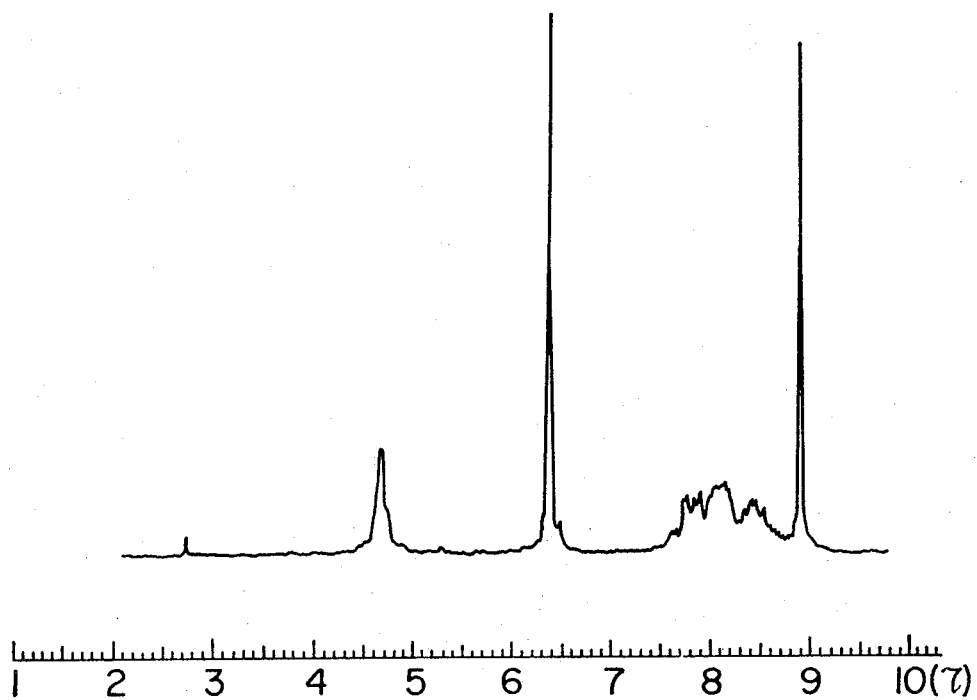
Figure 9:
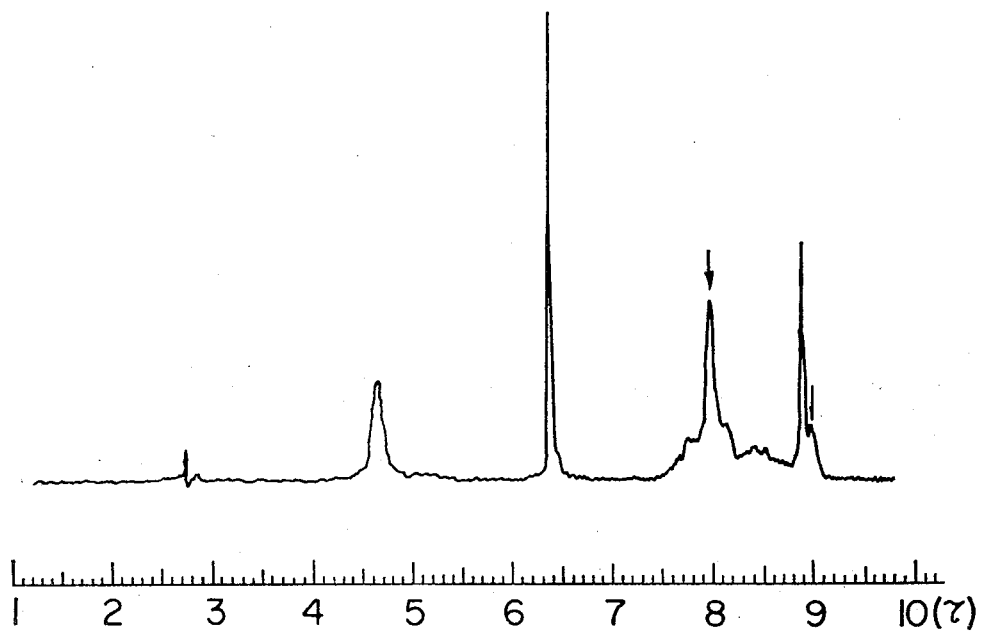
Figure 10:
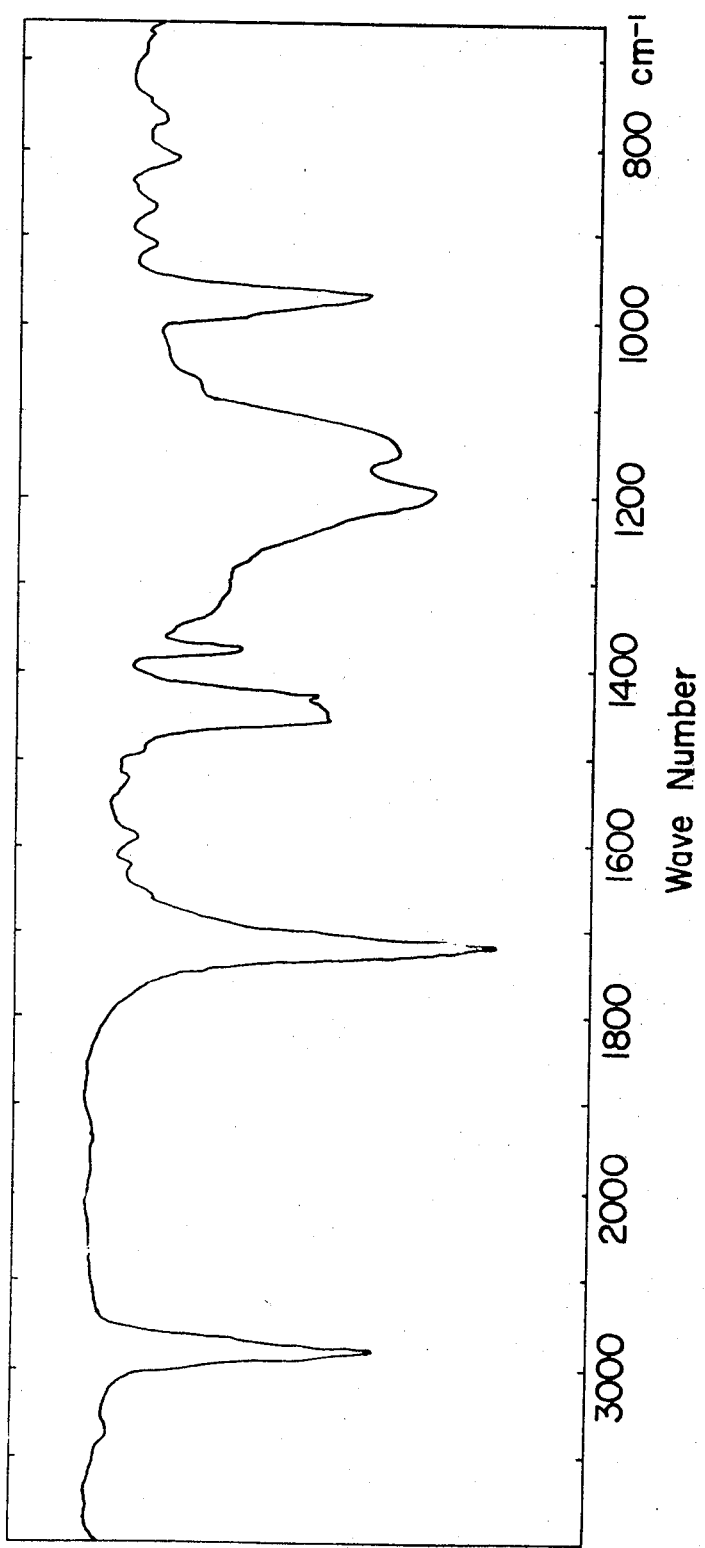
Figure 11:
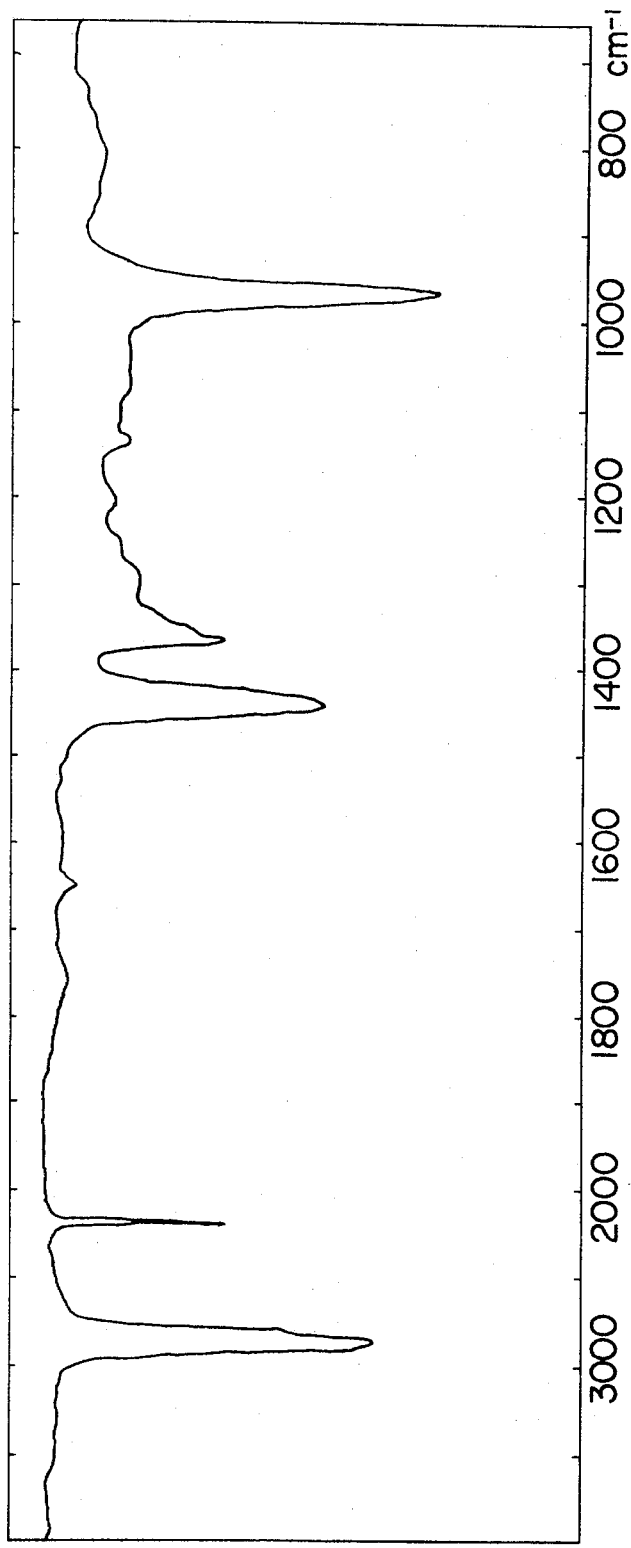

For a better understanding of this invention, following drawings are referred, wherein:

FIG. 1 shows a stress-strain curve of the butadiene/acrylonitrile alternating copolymer in the Example 82 (Curve (I)) in contrast with a conventional 1:1 random copolymer prepared by using a free-radical initiator (Curve (II)); and FIG. 2 shows a X-ray diffraction diagram of the butadiene/acrylonitrile alternating copolymer in the Example 82 (Curve (I)) in contrast with a conventional 1:1 random copolymer (Curve (II)); and FIG. 3 shows an IR dichroism of the butadiene/arylonitrile alternating copolymer in the Example 81 (Dotted curve shows an electric vector perpendicular to elongation and solid curve shows an electric vector parallel to elongation); and FIG. 4 shows an impact resilience curve of the butadiene/acrylonitrile alternating copolymer in the Example 1 (Curve (I)) in contrast with a conventional 1:1 random copolymer (Curve (II)); and FIG. 5 shows an IR spectrum of the butadiene/acrylonitrile alternating copolymer in the Example 1 in an unstretched state; and FIG. 6 shows a 100 MHz NMR spectrum of the butadiene/acrylonitrile alternating copolymer in the Example 1; and FIG. 7 shows a 100 MHz NMR spectrum of a conventional butadiene/acrylonitrile 1:1 random copolymer; and FIG. 8 shows a 100 MHz NMR spectrum of butadiene/methyl methacrylate alternating copolymer in the Example 84; and FIG. 9 shows a 100 MHz NMR spectrum of conventional butadiene/methyl methacrylate 1:1 random copolymer prepared by using a free-radical initiator; and FIG. 10 shows an IR spectrum of butadiene/methyl methacrylate alternating copolymer in the Example 59; and FIG. 11 shows an IR spectrum of pentadiene/acrylonitrile alternating copolymer in the Example 63.

The following are detailed explanations on the structure and the characteristics of resulting copolymers prepared in the processes according to the present invention:

a. Fractionations with solvents;

A resulting polymer from the copolymerization of butadiene with acrylonitrile according to the present invention is soluble in dimethylformamide, tetrahydrofuran, acetonitrile, benzonitrile, acrylonitrile, methyl ethyl ketone, chloroform, nitromethane, dioxane, acetone, dimethyl sulfoxide, aniline, nitropropane, nitrobenzene, ethyl acetate, trichloroethane and trichloroethylene, but insoluble in hexane, benzene and toluene.

These facts show that the said polymer is considerably different from polyacrylonitrile insoluble in acetonitrile, tetrahydrofuran, chloroform, dioxane and acetone and also from polybutadiene insolbule in dioxane, acetone, acetonitrile and soluble in toluene. Furthermore, it can be seen that the copolymer does not contain any one of homopolymers and has a considerably different structure from each one of homopolymers.

These facts indicate the resulting polymer has uniform structure different from polyacrylonitrile and polybutadiene.

b. Elemental analyses;

Compositions of resulting polymers in the copolymerizations according to the present invention are always supported to be 1:1 in molar ratio of the diene unit to the polar vinyl monomer unit by elemental analyses of the polymers.

c. IR spectra;

Microstructure of the diene units of the copolymers can be analyzed by means of IR spectra and NMR spectra of the copolymers. For example, the microstructure of butadiene unit of butadiene/acrylonitrile alternating copolymer of the present invention was analyzed by means of IR spectra (FIG. 5) using Morero's method (D. Morero et al., Chim. e. Ind., Vol. 4, p. 758 (1959)) to be trans-1,4 of more than 95 percent, vinyl of less than 5 percent and cis-1,4 of nearly 0 percent. The copolymers produced under different polymerization conditions afford always the same IR spectrum. Microstructures of diene units of other copolymers such as pentadiene/acrylonitrile copolymer, butadiene/methyl methacrylate copolymer and the like can also be analyzed by this method. From these analyses, it becomes clear that the copolymerizations according to the present invention afford the alternating copolymers wherein the diene units are bonded in such configurations as trans-1,4 of more than 90 percent in the copolymers of acrylonitrile with butadiene or pentadiene and of more than 85 percent in the other copolymers. IR spectra of the copolymers also afford informations on the vinyl monomer unit. From the IR spectra it becomes clear that all the vinyl monomers are copolymerized at the vinyl groups in the copolymerization according to the present invention.

d. NMR spectra;

NMR spectra of the copolymers afford informations not only on the microstructure but also on the degree of alternation of the diene units and the polar vinyl monomer units. In other words, the fraction of the dyad of the diene unit and the polar vinyl monomer unit can be measured by means of the NMR spectra. For example, in the case of butadiene/acrylonitrile copolymer, an NMR spectrum as shown in FIG. 6 is observed with the present alternating copolymer, on the other hand a some different NMR spectrum as shown in FIG. 7 is observed with a random copolymer having 1:1 composition. The NMR spectrum of the present copolymer lacks a peak at $\tau=7.87$, which appears in the NMR spectrum of the random copolymer of 1:1 composition. This peak increases with increase of acrylonitrile content of a butadiene/acrylonitrile random copolymer. On the basis of the presence of this peak assigned to a butadiene-butadiene dyad, the peak at $\tau=7.70$ assigned to a butadiene-acrylonitrile dyad, and the peak at $\tau=7.15$ assigned to an acrylonitrile-acrylonitrile dyad, the fractions of these dyads can be calculated by measuring areas of these peaks. According to these analyses, the alternating dyad fraction of the present butadiene/acrylonitrile alternating copolymer is always more than 92 percent. On the other hand, that of the random copolymer of 1:1 composition is only about 85 percent. The NMR spectrum of the present butadiene/methyl methacrylate alternating copolymer is also different from that of the random copolymer of 1:1 composition prepared by using a free-radical initiator as shown in FIGS. 8 and 9. The peaks assigned to successive dyads at 7.98 and 8.99 $\tau$ are scarcely recognized in the MNR spectrum of the present alternating copolymer as shown in FIG. 8. On the other hand these appear clearly in the spectrum of the random copolymer. These facts also support a regularly alternating structure of the copolymer chain of the butadiene/methyl methacrylate copolymer prepared in the process according to the present invention in contrast with a random structure of the copolymer prepared by using a free-radical initiator.

From the NMR spectra the microstructure of the diene units of the present copolymers such as isoprene/acrylonitrile copolymer, isoprene/methyl acrylate copolymer and the like are estimated to be trans-1,4 of more than 85 percent.

e. Composition analyses of the copolymers prepared at various monomer feed ratio;

Alternating copolymerization is also supported by analyzing compositions of copolymers formed at various monomer feed ratios. In other words, the composition of the copolymer prepared in the process according to the present invention is always 1:1 in molar ratio of the diene unit to the polar vinyl monomer unit irrespective of monomer feed ratios. On the other hand, the composition of a resulting copolymer varies depending upon monomer feed ratios in a process of polymerizing the same monomer pairs using a free-radical initiator.

f. Pyrolyses;

The degree of alternation of the diene unit and the polar vinyl monomer unit can be estimated by measuring the amount of monomers generated from the pyrolysis of the copolymer by means of gas chromatography. For example, in the case of butadiene/acrylonitrile copolymer, the acrylonitrile content of the generated monomer mixture from the pyrolysis of the present copolymer at 500°C was about 28 percent, while that of the random copolymer of 1:1 composition prepared by using a free-radical initiator was about 60 percent. These facts also support a high degree of alternation in the present copolymer.

Preceding explanations support that the polymer prepared in the process according to the present invention is a pure alternating copolymer of a conjugated diene and a conjugated polar vinyl monomer having trans-1,4 bonded diene unit and vinyl bonded polar vinyl monomer unit.

Following explanations clarify the characteristics of the present copolymer.

1. Stress-strain curve;

The stress-strain curve of the present butadiene/acrylonitrile alternating copolymer shows a characteristic feature as shown in FIG. 1. The curve (I) (Alternating copolymer) indicates rather low stress at a low strain and much increasing stress under highly stretched condition as observed with natural rubber. This desirable feature is caused by the orientation and the crystallization of the copolymer chain which originate from the regular structure of the copolymer chain. On the other hand the random copolymer (Curve (II)) has not such a feature. 2. X-ray diffraction diagram;

The orientation and the crystallization of the present butadiene/acrylonitrile alternating copolyemr under highly stretched condition are supported by its X-ray diffraction diagram as shown in FIG. 2 (Curve (I)) in contrast with a random copolymer (Curve (II)).

3. IR dichroism;

IR dichroism of the copolymer affords informations on the orientation and the crystallization of the copolymer. For example, IR dichroism can be observed with the highly stretched film of the butadiene/acrylonitrile alternating copolymer prepared in the process according to the present invention as shown in FIG. 3. In addition, new absorption bands assigned to crystalline bands are also observed as shown in FIG. 3. On the other hand, these IR dichroism and appearances of new absorption bands cannot be observed with a butadiene/acrylonitrile random copolymer both in a highly stretched state and a not-stretched state.

These facts shows that only the present alternating copolymer can be oriented and crystallized because of a high regularity in the structure of the copolymer chain.

As described above, the copolymers prepared in the process according to the present invention are the pure regular alternating copolymers different in the structure of polymer chains and many mechanical properties from random copolymers prepared by using free-radical initiators.

There are many applications in which these characteristics can be utilized and many of them are developed by the properties of the alternating copolymer which have not been possessed by the conventional random copolymer.

The alternating copolymers may be used as such and further may be converted to a material having a three-dimensional configuration by means of a cross linking agent.

They have wide utilizations, for example, they can be used for various plastics materials, materials for rubbery composition, adhesive, fiber, film, compound, latex, paint, surface treating agent, etc.

The following Comparative Examples are given in comparison with this invention and the following Examples are given in illustration of this invention and are not intended as limitations thereof.

COMPARATIVE EXAMPLE 1

The treatments in this comparative example were effected in the same manner as described in Example 32, except that ethylaluminum dichloride was used instead of the complex of ethylaluminum dichloride with acrylonitrile to obtain only a trace of polymer.

COMPARATIVE EXAMPLE 2

The treatments were effected in the same manner as described in Example 1, except that the vanadium compound was not used, to obtain only about 0.1 g of copolymer. This copolymer included gel of about 90 percent.

COMPARATIVE EXAMPLE 3

The treatments were effected in the same manner as described in Example 59, except that the addition order of carbon disulfide, vanadyl chloride, methylaluminum sesquichloride, methyl methacrylate, and butadiene was used, to obtain only a trace of polymer.

COMPARATIVE EXAMPLE 4

The treatments were effected in the same manner as described in Example 59, except that the vanadium compound was not used, to obtain only about 0.1 g of copolymer.

EXAMPLE 1

A glass ampoule was dried and deaerated and then filled with purified nitrogen. Into the ampoule were added 9 ml of purified and dried tetrachloroethylene as a solvent firstly, and then 4.2 ml of acrylonitrile at room temperature under a condition free from air and moisture. The ampoule was cooled to −78°C by means of dry ice-methanol system, and added with 5.0 ml of liquid butadiene and the resulting mixture was mixed by shaking the ampoule.

In the other reaction vessel, a solution of ethylaluminum dichloride in toluene having a concentration of 2 mol/$l$ was mixed with acrylonitrile of same mole as ethylaluminum dichloride at room temperature, and the resulting mixture was aged for more than 15 minutes to prepare a complex of ethylaluminum dichloride with acrylonitrile. When acrylonitrile was added to ethylaluminum dichloride, the reaction proceeded by an exothermic reaction. Further, it has been well-known that when both the components are mixed, a complex in which the nitrile group of acrylonitrile coordinates the aluminum of ethylaluminum dichloride is formed.

Into the above-mentioned ampoule was added the thus obtained complex of ethylaluminum dichloride with acrylonitrile in an amount of 2.5 mol percent based on the total amount of monomers and the resulting mixture was stirred. Then vanadyl trichloride was added thereto to an amount of 0.5 mol percent based on the total amount of monomers. The mixture was stirred by shaking the ampoule and then the ampoule was fused and sealed by a hand burner. After the ampoule was left to stand for 24 hours in ice water, the polymerization mixture in the ampoule was poured into a large amount of methanol containing a small amount of β-N-phenylnaphthylamine, whereby the copolymerization reaction was stopped and the resulting copolymer was precipitated. The precipitate was purified and dried to obtain 3.34 g of copolymer. The obtained copolymer was a rubbery elastic copolymer and was dissolved completely in dimethylformamide, chloroform, tetrahydrofuran, acetonitrile and nitrobenzene. The intrinsic viscosity of the copolymer in dimethylformamide at 30°C was 2.32. The copolymer was dissolved in deuterochloroform and the solution was measured with respect to NMR spectrum at 100 megacycle (FIG. 6).

As a control, NMR spectrum was measured with respect to a conventional random copolymer having a known acrylonitrile content under the same conditions (FIG. 7). As the result, it was confirmed that the composition of the copolymer can be determined from the ratio of the area of NMR spectrum of the methine proton in the butadiene unit to the area of NMR spectrum of the methine proton of the acrylonitrile unit and the methylene proton of the acrylonitrile unit and the butadiene unit. In this way, the composition of the resulting copolymer was identified.

As the result, it was found that the content of the acrylonitrile unit was 50.8 mol percent. That is, the resulting copolymer was composed of the same mole amount of the butadiene unit and the acrylonitrile unit and the composition was 1:1. Furthermore, it was found that the copolymer neither contain homopolymer nor block polymer by checking chemical shifts and has a good stereospecific property from the simplicity and the sharpness of NMR spectrum. The above-mentioned facts obtained by the NMR spectrum show that the copolymer is an alternating copolymer having a good stereospecific property. The fractions of the alternating dyad were measured by means of the NMR spectra to be 95 percent and 84 percent for the alternating copolymer of this example and the random one, respectively.

A film of the copolymer was formed on a rock salt plate and the IR spectrum of the copolymer was measured (FIG. 5). The characteristic absorption band of nitrile group in the acrylonitrile unit and that of trans-1,4 bond in the butadiene unit were observed apparently at 2,240 $cm^{-1}$ and 970 $cm^{-1}$, respectively. The characteristic absorption band of 1,2-bond in the butadiene unit was neglegible and that of cis-1,4 bond was not substantially observed. The microstructure value measured by Morero's method was 98 percent of trans-1,4 bond, 2 percent of 1,2-bond and ~0 percent of cis-1,4 bond.

As described above, the obtained copolymer was a high molecular weight rubbery elastic copolymer containing no part insoluble in dimethylformamide and all the butadiene units were connected in a trans-1,4 form and the butadiene unit and the acrylonitrile unit were bonded alternately. According to the elemental analysis, carbon was 77.41 percent, hydrogen 8.46 percent, and nitrogen 12.73 percent. In the theoretical values of the copolymer containing the same moles of butadiene and acrylonitrile, carbon is 78.45 percent, hydrogen 8.47 percent, and nitrogen 13.0 percent, so that the found values agree with the theoretical values very well. The impact resilience of the alternating copolymer of this example (Curve (I)) was superior to that of the random copolymer (Curve (II)) as shown in FIG. 4.

EXAMPLE 2

In the same manner as described in Example 1, an ampoule was cooled to −78°C under nitrogen atmosphere and into the ampoule were added 10 m$l$ of toluene, 5 m$l$ of acrylonitrile, 10 m$l$ of butadiene, and 1.8 mol percent of ethylaluminum dichloride and 0.036 mol percent of vanadyl trichloride based on the total amount of the monomers respectively in this order. The ampoule was left to stand at 0°C for 1 hour and then the copolymerization reaction was stopped to obtain 1.6 g of rubbery elastic copolymer. The IR spectrum and the NMR spectrum of the resulting rubbery elastic copolymer agreed completely with those of the copolymer obtained in Example 1, so that the copolymer was an alternating copolymer. Content of the acrylonitrile unit calculated from the area of NMR spectrum was 50.7 percent. The butadiene unit was connected in a trans-1,4 form about 93 percent and was bonded with the acrylonitrile unit in 95 percent alternation.

EXAMPLE 3

In the same manner as described in Example 2, 20 m$l$ of toluene, 250 mol of acrylonitrile, 25 mmol of butadiene, 1.25 mmol of a complex of ethylaluminum dichloride with acrylonitrile and 0.0625 mmol of tri-tert-butoxy vanadyl were added into an ampoule in this order. The ampoule was sealed and left to stand for 24 hours at 0°C to obtain 1 g of rubbery elastic copolymer. The IR spectrum and NMR spectrum of the rubbery elastic copolymer showed that the copolymer was the same alternating copolymer as described in Example 1. The elemental analysis indicated that the content of acrylonitrile is 49.5 mol percent.

EXAMPLE 4

In the same manner as described in Example 3, 20 m$l$ of toluene, 250 mmol of acrylonitrile, 50 mmol of butadiene, 2.5 mmol of a complex of ethylaluminum dichloride with acrylonitrile and 0.125 mmol of tri-tert-butoxy vanadyl were added into an ampoule in this order. The ampoule was sealed and left to stand for 24 hours at 0°C to obtain 2.3 g of rubbery elastic copolymer. The IR spectrum and NMR spectrum of the copolymer showed that it was the same alternating copolymer as described in Example 1.

EXAMPLE 5

The treatment in this example was effected in the same manner as described in Example 4, except that 10 m$l$ of toluene and 50 mmol of acrylonitrile were used, to obtain a rubbery elastic copolymer in a yield of 62 percent. The IR spectrum and the NMR spectrum of the resulting elastic copolymer showed that it was the same alternating copolymer as described in Example 1.

EXAMPLE 6

20 m$l$ of toluene, 40 mmol of acrylonitrile, 250 mmol of butadiene, 1.25 mmol of a complex of ethylaluminum dichloride with acrylonitrile and 0.0625 mmol of tri-tert-butoxy vanadyl were treated with the same manner as described in Example 5 to obtain 1.1 g of rubbery elastic copolymer. The IR spectrum and the NMR spectrum of the resulting rubbery elastic copolymer showed that it was the same alternating copolymer as described in Example 1.

EXAMPLES 7 – 13

In the same manner as described in Example 5, 9 m$l$ of toluene, 4.2 m$l$ of acrylonitrile, 5 m$l$ of butadiene and 2.5 mol percent of a complex dichloride with acrylonitrile based on the total amount of monomers were added into an ampoule. Then tri-tert-butoxy vanadyl was added thereto in an amount calculated from the V/A$l$ ratio as shown in the following Table 1. The ampoule was sealed and kept at 0°C for 24 hours. The yield, the intrinsic viscosity and the insoluble part in dimethylformamide of the resulting copolymer are shown in Table 1. Furthermore, the IR spectrum and the NMR spectrum of the resulting copolymer showed that all of them were the same alternating copolymers as described in Example 1. The copolymers had an appearance of rubbery elastic copolymer.

Table 1

| Example No. | V/Al (g-atom/g-atom) | Yield (%) | Intrinsic viscosity | Insoluble part* in DMF (%) |
|---|---|---|---|---|
| 7 | 1/1 | 19 | 0.81 | 13 |
| 8 | 1/3 | 52 | | |
| 9 | 1/20 | 65 | | |
| 10 | 1/50 | 62 | 1.12 | 33 |
| 11 | 1/80 | 60 | | |
| 12 | 1/1,000 | 34 | | |
| 13 | 1/10,000 | 24 | 1.14 | 88 |

*Insoluble part in dimethylformamide

EXAMPLE 14

The treatment was effected in the same manner as described in Example 10, except that di-tert-butoxy vanadyl chloride instead of tri-tert-butoxy vanadyl, and 10 ml of butadiene were used, to obtain 4.2 g of rubbery elastic copolymer, which had an intrinsic viscosity of 1.07. The IR spectrum and the NMR spectrum of the resulting elastic copolymer showed that it was the same alternating copolymer as described in Example 1. The insoluble part in dimethylformamide was 30 percent.

EXAMPLE 15

The treatment was effected in the same manner as described in Example 14, except that tert-butoxy vanadyl dichloride was used instead of di-tert-butoxy vanadyl chloride, to obtain 3.2 g of rubbery elastic copolymer. The IR spectrum and the NMR spectrum of the resulting copolymer showed that it was the same alternating copolymer as described in Example 1. The intrinsic viscosity was 1.31 and the insoluble part in dimethylformamide was 5 percent.

EXAMPLE 16

The treatment was effected in the same manner as described in Example 15, except that vanadyl trichloride was used instead of tert-butoxy vanadyl dichloride, to obtain 2.5 g of rubbery elastic copolymer. From IR spectrum and NMR spectrum, it was found that the resulting copolymer was the same alternating copolymer as described in Example 1. The intrinsic viscosity was 1.40 and theere was no part insoluble in dimethylformamide.

EXAMPLE 17

The treatment was effected in the same manner as described in Example 16, except that triethoxy vanadyl was used instead of vanadyl trichloride, to obtain 2.4 g of rubbery elastic copolymer. From IR spectrum and NMR spectrum it was found that the resulting copolymer was the same alternating copolymer as described in Example 1.

EXAMPLE 18

The treatment was effected in the same manner as described in Example 17, except that vanadium tetrachloride was used instead of triethoxy vanadyl, to obtain 1.8 g of rubbery elastic copolymer. From IR spectrum and NMR spectrum, it was found that the resulting copolymer was the same alternating copolymer as described in Example 1.

EXAMPLE 19

The treatment was effected in the same manner as described in Example 18, except that vanadyl diacetylacetonate was used instead of vanadium tetrachloride, to obtain 3.0 g of rubbery elastic copolymer, which had an intrinsic viscosity of 1.56 and was dissolved completely in dimethylformamide at room temperature. From IR spectrum and NMR spectrum, it was found that the resulting copolymer was the same alternating copolymer as described in Example 1.

EXAMPLE 20

The treatment was effected in the same manner as described in Example 19, except that vanadium triacetylacetonate was used instead of vanadyl diacetylacetonate, to obtain 2.8 g of rubbery elastic copolymer, which had an intrinsic viscosity of 1.58 and contained 5 percent of insoluble part in dimethylformamide. From IR spectrum and NMR spectrum, it was found that the resulting copolymer was the same alternating copolymer as described in Example 1.

EXAMPLE 21

The treatment was effected in the same manner as described in Example 10, except that tetrachloroethylene was used instead of toluene as a solvent. The resulting mixture was kept at 0°C for 24 hours to obtain an elastic solid copolymer in a yield of 88 percent. The intrinsic viscosity was 0.91. From IR spectrum and NMR spectrum, it was found that the resulting copolymer as the same alternating copolymer as described in Example 1.

EXAMPLES 22 – 29

The treatments in these examples were effected in the same manner as described in Example 21, except that the vanadyl compound of monomers and kind of solvent was varied as shown in the following Table 2, to obtain a result as shown in Table 2. All of the resulting copolymers were rubbery elastic copolymers, and from IR spectrum and NMR spectrum, it was found that they were the same alternating copolymers as described in Example 1.

Table 2

| Example No. | Solvent | Yield (%) | Specific viscosity | Insoluble part in DMF* (%) |
|---|---|---|---|---|
| 22 | n-Hexane | 75 | 0.74 | 55 |
| 23 | Toluene | 67 | 0.91 | 36 |
| 24 | Monochlorobenzene | 60 | | |
| 25 | o-Dichlorobenzene | 65 | | |
| 26 | Dichloroethane | 47 | | |
| 27 | Dichloromethane | 39 | | |
| 28 | Tetrachloroethylene | 92 | 1.08 | 67 |
| 29 | Carbon tetrachloride | 79 | | |

*Insoluble part in dimethylformamide in the copolymer.

EXAMPLES 30 – 34

The treatments in these examples were effected in the same manner as described in Example 14, except that the addition order or monomers and catalytic components was varied, to obtain a result as shown in the following Table 3. All of the resulting copolymers were rubbery elastic copolymers and from IR spectrum and NMR spectrum, it was found that they were the same alternating copolymers as described in Example 1.

Table 3

| Example No. | Addition order | Yield (q) | Specific viscosity |
|---|---|---|---|
| 30 | T - AN - BD - Al - V | 3.6 | 1.44 |
| 31 | T - Al - AN - BD - V | 3.9 | 1.43 |
| 32 | T - Al - V - AN - BD | 3.9 | 1.42 |
| 33 | T - AN - BD - V - Al | 3.7 | 1.42 |
| 34 | T - V - AN - BD - Al | 3.7 | 1.53 |

In the above Table 3, T: toluene, AN: acrylonitrile, BD: butadiene, Al: complex of ethylaluminum dichloride with acrylonitrile, V: tri-tert-butoxy vanadyl.

EXAMPLE 35

The treatment was effected in the same manner as described in Example 31, except that ethylaluminum dichloride was used instead of the complex of ethylaluminum dichloride with acrylonitrile, and toluene, ethylaluminum dichloride and acrylonitrile were added at 0°C, to obtain a rubbery elastic copolymer at a yield of 57 percent. The specific viscosity was 1.26. From IR spectrum and NMR spectrum, it was found that the resulting copolymer was the same alternating copolymer as described in Example 1.

EXAMPLE 36

The treatment was effected in the same manner as described in Example 2, except that tri-tert-butoxy vanadyl was used instead of vanadyl trichloride, and toluene, acrylonitrile, butadiene, tri-tert-butoxy vanadyl and ethylaluminum dichloride were added in this order. The resulting mixture was kept at 0°C for 1 hour to obtain 2.3 g of rubbery elastic copolymer. From IR spectrum and NMR spectrum, it was found that the resulting copolymer was the same alternating copolymer as described in Example 1.

EXAMPLE 37

The treatment was effected in the same manner as described in Example 2, except that toluene, acrylonitrile, vanadyl trichloride, ethylaluminum dichloride and butadiene were added in this order. The resulting mixture was kept at 0°C for 1 hour to obtain 1.4 g of rubbery elastic copolymer. From IR spectrum and NMR spectrum, it was found that the resulting rubbery elastic copolymer was the same alternating copolymer as described in Example 1.

EXAMPLE 38

The treatment was effected in the same manner as described in Example 37, except that the addition order of the aluminum compound and the vanadium compound was reversed. The resulting mixture was kept at 0°C for 1 hour to obtain 1.6 g of rubbery elastic copolymer. From IR spectrum and NMR spectrum, it was found that the resulting copolymer was the same alternating copolymer as described in Example 1.

EXAMPLE 39

The treatment was effected in the same manner as described in Example 20, except that tetrabutoxy titanium was used instead of vanadium triacetylacetonate, to obtain 1.4 g of rubbery elastic copolymer. The intrinsic viscosity was 1.48. From IR spectrum and NMR spectrum, it was found that the resulting copolymer was the same alternating copolymer as described in Example 1.

EXAMPLE 40

The treatment was efffected in the same manner as described in Example 39, except that titanium tetrachloride was used instead of tetrabutoxy titanium, to obtain 1 g of rubbery elastic copolymer. The intrinsic viscosity was 1.62. From IR spectrum and NMR spectrum, it was found that the resulting copolymer was the same alternating copolymer as described in Example 1.

EXAMPLE 41

The treatment was effected in the same manner as described in Example 40, except that oxy-titanium diacetylacetonate was used instead of titanium tetrachloride, to obtain 1.2 g of rubbery elastic copolymer. From IR spectrum and NMR spectrum, it was found that the resulting copolymer was the same alternating copolymer as described in Example 1.

EXAMPLES 42 – 44

Various complexes of organoaluminum halide with acrylonitrile were prepared in the same manner as described in Example 1 for preparing the complex of ethylaluminum dichloride with acrylonitrile, and the following experiment was effected.

The treatment was effected in the same manner as described in Example 10, except that various complexes of organoaluminum halide with acrylonitrile were used instead of the complex of ethylaluminum dichloride with acrylonitrile and 10 ml of butadiene were used, to obtain a result as shown in the following Table 4. All of the resulting copolymers were rubbery elastic copolymers and from IR spectrum and NMR spectrum, it was found that they were the same alternating copolymers as described in Example 1.

Table 4

| Example No. | Complex of organoaluminum with acrylonitrile | Yield (q) | Specific viscosity |
|---|---|---|---|
| 42 | Complex of ethylaluminum sesquichloride with actylonitrile | 2.8 | 2.06 |
| 43 | Complex of ethylaluminum sesquibroomide with acrylonitrile | 3.8 | 1.64 |
| 44 | Complex of isobutylaluminum sesquibromide with acrylonitrile | 0.7 | |

EXAMPLES 45 – 56

Various basic compounds and ethylaluminum dichloride were reacted in the same manner as described in Example 1 for preparing the complex of ethylaluminum dichloride with acrylonitrile to produce various reaction products. The reaction product was used for the following experiment.

In the same manner as described in Example 2, 20 ml of toluene, 50 mmol of acrylonitrile, 250 mmol of butadiene, 2.5 mmol of a complex of ethylaluminum dichloride with a basic compound and 0.05 mmol of tri-tert-butoxy vanadyl were added into an ampoule in this order. The ampoule was sealed and kept at 0°C for 24 hours to obtain a result as shown in the following Table 5. All of the resulting copolymers were rubbery elastic copolymers and from IR spectrum and NMR spectrum, it was found that they were the same alternating copolymers as described in Example 1.

Table 5

| Example No. | Complex forming basic compound | Yield (g) | specific viscosity | Insoluble part in DMF (%) |
|---|---|---|---|---|
| 45 | Methyl methacrylate | 3.0 | 0.79 | 69 |
| 46 | Methacrylonitrile | 3.0 | 1.09 | 75 |
| 47 | Acetonitrile | 2.6 | 1.88 | 85 |
| 48 | Ethyl benzoate | 2.2 | | |
| 49 | Acrylonitrile | 3.2 | 1.16 | 68 |
| 50 | Thiophene | 1.8 | 0.48 | 23 |
| 51 | Ethyl acrylate | 2.4 | | |
| 52 | Dimethylaniline | 1.5 | | ~0 |
| 53 | Benzonitrile | 2.5 | | |
| 54 | Fumaronitrile | 1.9 | | |
| 55 | Triphenylamine | 3.0 | 0.50 | 35 |
| 56 | None | 4.4 | 0.93 | 70 |

EXAMPLE 57

The treatment was effected in the same manner as described in Example 31, except that the polymerization was effected at 40°C, to obtain 3.1 g of rubbery elastic copolymer. The specific viscosity was 1.04. From IR spectrum and NMR spectrum, it was found that the resulting copolymer was the same alternating copolymer as described in Example 1.

EXAMPLE 58

The treatment was effected under the same condition as described in Example 1, except that the solvent was not used, to obtain 4.2 g of butadiene/acrylonitrile copolymer containing no part insoluble in dimethylformamide. From IR spectrum and NMR spectrum, it was found that the resulting copolymer was the same alternating copolymer as described in Example 1. The intrinsic viscosity was 2.5.

EXAMPLE 59

Into an ampoule were added 10.2 ml of butadiene, 7.0 ml of methyl methacrylate, 17 ml of carbon disulfide, 9.9 mmol of methylaluminum sesquichloride, 0.2 mmol of vanadyl trichloride at −78°C under gaseous nitrogen atmosphere. The resulting mixture was kept at 20°C for 24 hours to obtain 3.1 g of elastic solid copolymer. From IR spectrum (FIG. 10), NMR spectrum (FIG. 8) and elemental analysis, it was found that in the resulting elastic solid copolymer, the butadiene unit was connected in a trans-1,4 form of more than 85 percent and the butadiene unit and the methyl methacrylate unit were bonded in more than 90 percent of alternation. The intrinsic viscosity was 1.0.

EXAMPLE 60

The treatment was effected under the same condition as described in Example 1, except that carbon disulfide was used as a solvent, to obtain 1.9 g of butadiene/acrylonitrile copolymer containing no part insoluble in dimethylformamide. It was found from IR spectrum and NMR spectrum that the resulting copolymer was the same alternating copolymer as described in Example 1.

EXAMPLE 61

Into an ampoule were added 17 ml of carbon tetrachloride, 5 ml of methyl acrylate, 12.8 ml of butadiene at −78°C. Then, 11.1 mmol of ethylaluminum dichloride and 0.22 mmol of triethoxy vanadyl were added thereto. The resulting mixture was kept at 0°C for 24 hours to obtain 2.0 g of elastic solid copolymer. From IR spectrum, pyrolysis gas chromatography and elemental analysis, it was found that in the resulting solid copolymer, the butadiene unit was connected in a high trans-1,4 form, and the butadiene unit and the methyl acrylate unit were bonded alternately.

EXAMPLE 62

Into an ampoule were added 9 ml of tetrachloroethylene, 4.0 ml of acrylonitrile and 5.5 ml of isoprene at −78°C. Then, 25 mol percent of methylaluminum dichloride and 0.05 mol percent of vanadyl trichloride based on the total amount of monomers respectively were added thereto. The resulting mixture was kept at 0°C for 24 hours to obtain a white gel free solid copolymer in a yield of 33 percent. From IR spectrum, NMR spectrum, and elemental analysis, it was found that in the resulting copolymer, the isoprene unit was connected in a trans-1,4 form of about 90 percent, and the isoprene unit and the acrylonitrile unit were bonded in about 93 percent of alternation. The intrinsic viscosity was 1.13.

EXAMPLE 63

Into an ampoule were added 9 ml of tetrachloroethylene, 4.0 ml of acrylonoitrile and 5.5 ml of pentadiene-1,3. Then 2.5 mol percent of isobutylaluminum sesquibromide and 0.05 mol percent of vanadyl diacetylacetonate based on the total amount of monomers respectively were added thereto at −78°C. The resulting mixture was kept at 0°C for 20 hours to obtain 1.5 g of elastic copolymer. From IR spectrum (FIG. 11), NMR spectrum and elemental analysis, it was found that in the resulting copolymer, the pentadiene unit was connected in a trans-1,4 form of more than 95 percent, and the pentadiene unit and the acrylonitrile unit were bonded in more than 92 percent of alternation.

EXAMPLE 64

Into an ampoule were added 7 ml of methyl methacrylate and 5 ml of isoprene. Then 2.5 mol percent of ethylaluminum dichloride and 0.05 g-atom V/1 mole monomer of vanadyl naphthenate based on the total amount of monomers respectively were added thereto at −78°C. The resulting mixture was kept at 20°C for 20 hours to obtain 2.8 g of white solid copolymer. From IR spectrum, pyrolysis gas chromatography, elemental analysis and NMR spectrum, it was found that in the resulting white solid copolymer, isoprene unit was connected in a high trans-1,4 form, and the isoprene unit and the methyl methacrylate unit were bonded alternately.

EXAMPLE 65

Into an ampoule were added 4.3 mmol of aluminum trichloride. The ampoule was cooled to −78°C and 15 ml of n-hexane, 7 ml of ethyl methacrylate, 8.8 ml of butadiene, 0.17 mmol of vanadyl diacetate and 4.3 mmol of ethylaluminum dichloride were added thereto in this order. The resulting mixture was kept at 25°C for 24 hours to obtain 3.7 g of white elastic solid copolymer. From IR spectrum, pyrolysis gas chromatography and elemental analysis, it was found that in the resulting white solid copolymer, the butadiene unit was connected in a high trans-1,4 form and the butadiene unit and the ethyl methacrylate unit were bonded alternately.

EXAMPLE 66

Into an ampoule were added 5 ml of methyl methacrylate, 11.1 ml of pentadiene-1,3, 8.2 mmol of ethylaluminum dichloride and 0.16 mmol or tripropoxy vanadyl in this order at −78°C. The resulting mixture was kept at 25°C for 24 hours to obtain 2.3 g of white copolymer. From IR spectrum, pyrolysis gas chromatography and elemental analysis, it was found that in the resulting white copolymer, the pentadiene unit was connected in a high trans-1,4 form, and the pentadiene unit and the methyl methacrylate unit were bonded alternately.

EXAMPLE 67

Into an ampoule were added 5.8 mmol of aluminum trichloride and 3.5 ml of ethyl acrylate. Then the ampoule was cooled to −78°C, and 4.1 ml of butadiene, 5.0 mmol of diethylaluminum chloride and 0.1 mmol or tri-tert-butoxy vanadyl were added thereto. The resulting mixture was kept at 25°C for 24 hours to obtain 1.3 g of white copolymer. From IR spectrum, pyrolysis gas chromatography and elemental analysis, it was found that in the resulting white copolymer, the butadiene unit was connected in a high trans-1,4 form, and the butadiene unit and the ethyl acrylate unit were bonded alternately.

EXAMPLE 68

Into an ampoule were added 4.5 ml of acrylonitrile and 5.0 ml of butadiene at −78°C. Then, 1.25 mol percent of ethylaluminum sesquichloride and 1.25 mol percent of ethylaluminum dichloride based on the total amount of monomers respectively were added thereto, and further 0.05 mmol of vanadyl trichloride was added thereto. The resulting mixture was kept at 0°C for 24 hours to obtain 2.8 g of elastic solid copolymer. From IR spectrum, NMR spectrum and elemental analysis, it was found that the resulting copolymer was the same alternating copolymer as described in Example 1. The intrinsic viscosity was 2.0.

EXAMPLE 69

Into an ampoule were added 4.0 mmol of aluminum trichloride and 1.3 mmol of triethyl aluminum. The resulting mixture was aged for 10 minutes at room temperature and 4.5 ml of acrylonitrile were added thereto. Then, 5.5 ml of butadiene and 0.01 mmol of vanadyl trichloride were added thereto at −78°C. The resulting mixture was kept at 0°C for 24 hours to obtain 3.3 g of white solid copolymer. From IR spectrum, NMR spectrum and elemental analysis, it was found that the resulting copolymer was the same alternating copolymer as described in Example 1.

EXAMPLE 70

The treatment was effected under the same condition as described in Example 1, except that the solvent was not used and penta-ethoxy tantalum was used instead of vanadyl trichloride, to obtain 3.5 g of white elastic solid copolymer. From IR spectrum, NMR spectrum and elemental analysis, it was found that the resulting copolymer was the same alternating copolymer as described in Example 1.

EXAMPLE 71

The treatment was effected under the same condition as described in Example 1, except that tetra-n-butoxy zirconium was used instead of vanadyl trichloride, to obtain 1.3 g of elastic solid copolymer. From IR spectrum, NMR spectrum and elemental analysis, it was found that the resulting copolymer was the same alternating copolymer as described in Example 1.

EXAMPLE 72

Into an ampoule were added 7 ml of methacrylonitrile, 12.9 ml of butadiene, 12.5 mmol of ethylaluminum sesquichloride and 0.25 mmol of vanadyl diacetate in this order at −78°C. The resulting mixture was kept at 25°C for 24 hours to obtain 2.5 g of white solid copolymer. From IR spectrum, pyrolysis gas chromatography and elemental analysis, it was found that in the resulting white solid copolymer, the butadiene unit was connected in a high trans-1,4 form, and the butadiene unit and the methacrylonitrile unit were bonded alternately.

EXAMPLE 73

Acrylonitrile and isoprene were added into a glass ampoule in a mole ratio of 3:1 at −78°C. Then ethylaluminum dichloride was added thereto in an amount of 1.25 mol percent based on the total amount of monomers in the form of 2 mole solution in toluene, and further vanadyl trichloride was added in an amount of 0.025 mol percent based on the total amount of monomers in the form of dichloroethane solution. The ampoule was sealed and left to stand for 24 hours at 0°C. The reaction product was poured into a large amount of methanol to precipitate the resulting copolymer. The copolymer was purified by dissolving the copolymer in tetrahydrofuran and then pouring the resulting tetrahydrofuran solution into methanol to precipitate the copolymer. Then the purified copolymer was dried under reduced pressure to obtain a white solid copolymer in a yield of 16.3 percent. The elemental analysis showed that the nitrogen content was 11.16 percent, and the valve agreed with the theoretical nitrogen content of 11.56 percent in the 1:1 copolymer. From IR spectrum and NMR spectrum, it was found that in the copolymer, the isoprene unit was connected in a trans-1,4 form of about 90 percent and both the monomer units were bonded in about 95 percent of alternation. The intrinsic viscosity was 1.13 in dimethylformamide at 30°C.

EXAMPLE 74

Titanium tetrachloride was added into a glass ampoule in an amount of 1/2 based on the total amount of monomers as a solvent. Then into the ampoule were added acrylonitrile and isoprene in a mole ratio of 1:2, a complex of ethylaluminum dichloride with acrylonitrile (abridged as AlEtCl$_2$ ·AN) which had previously been prepared by mixing ethylaluminum dichloride with acrylonitrile in the same mole at room temperature, in an amount of 1.7 mol percent based on the total amount of monomers, and then vanadyl trichloride in an amount of 0.039 mol percent based on the total amount of monomers. The ampoule was sealed and kept in an ice water for 24 hours. The reaction product was after-treated, purified and dried to obtain a resinous elastic solid copolymer in a yield of 24.2 percent.

The specific visocosity waa 1.1 in dimethylformamide at 30°C. The elemental analysis showed that the nitrogen content was 10.98 percent. The composition of the copolymer calculated from this value was isoprene: acrylonitrile = 52:48 (mole ratio). In conventional radical copolymerization, the expected value is 61:39 (mole ratio), so that this copolymer was apparently different from the copolymer in this Example. From IR spectrum and pyrolysis gas chromatography, it was found that in the copolymer, the isoprene unit was connected in a high trans-1,4 form and both the monomer units were bonded alternately.

EXAMPLE 75

The treatment was effected under the same condition as described in Example 73, except that pentadiene-1,3 was used instead of isoprene, to obtain an elastic copolymer in a yield of 10 percent. The elemental analysis showed that the resulting copolymer had a composition of pentadiene:acrylonitrile = 53:47 (mole ratio). From IR spectrum and NMR spectrum, it was found that in the copolymer, the pentadiene unit was connected in a trans-1,4 form of about 95 percent and both the monomer units were bonded in about 95 percent of alternation.

EXAMPLE 76

The treatment was effected under the same condition as described in Example 75, except that the feed ratio of pentadiene to acrylonitrile was 3:1, to obtain an elastic copolymer in a yield of 15 percent. The elemental analysis showed that the resulting copolymer had a composition of pentadiene: acrylonitrile = 53:47 (mole ratio). From IR spectrum and NMR spectrum, it was found that in the copolymer, pentadiene unit was connected in a high trans-1,4 form and both the monomer units were bonded alternately.

EXAMPLE 77

The treatment was effected in the same manner as described in Example 74, except that butadiene-1,3 instead of isoprene and methyl methacrylate instead of acrylonitrile were used respectively, and the polymerization was effected at 25°C for 15 hours, to obtain a rubbery elastic copolymer in a yield of 20 percent. The specific viscosity was 0.86 in toluene at 30°C. The elemental analysis showed that the resulting copolymer contained 20.62 percent of oxygen, 70.33 percent of carbon and 9.39 percent of hydrogen. The value agreed very well to the theoretical value of 1:1 copolymer, that is, 20.74 percent of oxygen, 70.13 percent of carbon and 9.15 percent of hydrogen. The elemental analysis showed that the copolymer had a composition of butadiene:methyl methacrylate = 50.5:49.5 (mole ratio). In the free radical copolymerization, butadiene:-methyl methacrylate = 67:33 (mole ratio) is expected. Therefore, it shows that a 1:1 copolymer is formed in an entirely different polymerization mechanism in this example. From IR spectrum and pyrolysis gas chromatography, it was found that in the copolymer, the butadiene unit was connected in a high trans-1,4 form and both the monomer units were bonded alternately.

EXAMPLE 78

The treatment was effected in the same manner as described in Example 77, except that ethyl methacrylate was used instead of methyl methacrylate, to obtain a rubbery elastic copolymer in a yield of 25 percent. The specific viscosity was 1.04 in toluene at 30°C. The elemental analysis showed that the resulting copolymer had a composition of butadiene: ethyl methacrylate = 55:45 (mole ratio). From IR spectrum and pyrolysis gas chromatography, it was found that in the copolymer the butadiene unit was connected in a high trans-1,4 form and both the monomer units were bonded alternately.

EXAMPLE 79

In a similar manner as described in Example 1, an ampoule was cooled to 0°C under nitrogen atmosphere and into the ampoule were added 10 ml of n-hexane, 5 ml of acrylonitrile, 5 ml of butadiene, and 0.06 mole percent of vanadyl trichloride and 1.8 mole percent of ethylaluminum dichloride based on the total amount of the monomers respectively in this order. The ampoule was left to stand at 10°C for 5 hours. 1.9 g of gel-free elastic copolymer was obtained. The NMR spectrum of the copolymer lacks the peaks assigned to butadiene-butadiene and acrylonitrileacrylonitrile successive dyads. Elemental analyses indicated for the copolymer composition to be 1:1 in the molar ratio of the butadiene units to the acrylonitrile units. The IR spectrum of the copolymer agreed completely with those of the copolymer in Example 1. These facts indicated that this copolymer is 1:1 alternating copolymer wherein the butadiene unit bonded in a trans-1,4 form.

EXAMPLE 80

Except that temperatures for catalyst preparation and polymerization were +20°C and +40°C respectively and a molar ratio of vanadyl trichloride to ethylaluminum dichloride was 1:20 and n-hexane was not used, the treatments were effected in the same manner as described in Example 79 to obtain 2.4 g of gel-free elastic copolymer. The NMR, IR, and elemental analysis indicated for this copolymer to be 1:1 alternating copolymer same as that in Example 1. The intrinsic viscosity of the copolymer in dimethylformamide at 30°C was 1.85.

EXAMPLE 81

Except that temperatures for catalyst preparation and polymerization were −40°C and 0°C respectively and a molor ratio of vanadyl trichloride to ethylaluminum dichloride was 1:50, the treatments were effected in the same manner as described in Example 80 to obtain 1.7 g of gel-free elastic copolymer. The intrinsic viscosity of the copolymer in dimethylformamide at 30°C was 2.35. The elemental analyses indicated for this copolymer to have 1:1 composition. The IR dichroism showed orientation and crystallization of this copolymer under a highly stretched state as shown in FIG. 3. NMR analysis of this copolymer indicated that the alternating dyad fraction is 92 percent. IR analysis indicated that the butadiene unit is bonded in a trans-1,4 form of more than 90 percent.

EXAMPLE 82

Except that temperature for catalyst preparation was −60°C and a molar ratio of vanadyl trichloride to ethylaluminum dichloride was 1:100, the treatments were effected in the same manner as described in Example 81 to obtain 1.2 g of gel-free copolymer. The intrinsic viscosity of the copolymer in dimethylformamide at 30°C was 3:00. The elemental analyses indicated for this copolymer to have 1:1 composition. The X-ray diffraction diagram and the stress-strain curve showed orientation and crystallization of this copolymer under a highly stretched state as shown in FIGS. 2 and 1, respectively. NMR analysis indicated that the alternating dyad fraction is 98 percent. IR analysis indicated that the butadiene unit is bonded in a trans-1,4 form of more than 95 percent.

EXAMPLE 83

Except that temperatures for catalyst preparation and polymerization were −78°C and −20°C respectively, the treatments were effected in the same manner as described in Example 80 to obtain 0.8 g of gel-free copolymer. The intrinsic viscosity of the copolymer in dimethylformamide at 30°C was 1.23. The NMR, IR, and elemental analyses indicated for this copolymer to be the same as that in Example 81.

EXAMPLE 84

Except that methyl methacrylate was used instead of acrylonitrile and polymerization temperature was +10°C and polymerization time was 8 hours, the treatments were effected in the same manner as described in Example 81 to obtain 1.5 g of gel-free copolymer. The intrinsic viscosity of this copolymer in toluene at 30°C was 1.41. The NMR spectrum of the copolymer lacks the peaks assigned to butadiene-butadiene and methyl methacrylate-methyl methacrylate successive dyads at 7.98 and 8.99 $\tau$ as shown in FIG. 8. Elemental analyses indicated for this copolymer composition to be 1:1 in the molar ratio of the butadiene units to the methyl methacrylate units. The IR spectrum of this copolymer showed that the microstructure of the butadiene unit is trans-1,4 form of more than 85 percent. The facts indicated that this copolymer is 1:1 alternating copolymer wherein the butadiene unit bonded in a trans-1,4 form of more than 85 percent.

EXAMPLE 85

Except that propyl acrylate was used instead of methyl methacrylate and temperatures for catalyst preparation and polymerization were 0°C and +20°C respectively, the treatments were effected in the same manner as described in Example 84 to obtain 1:1 g of gel-free copolymer. The intrinsic viscosity of this copolymer in toluene at 30°C was 0.95. The NMR, IR, and elemental analyses indicated for this copolymer to be 1:1 alternating copolymer wherein the butadiene unit is bonded in more than 85 perent of trans-1,4 form.

EXAMPLE 86

Except that butyl acrylate was used instead of methyl methacrylate, the treatments were effected in the same manner as described in Example 85 to obtain 0.9 g of gel-free copolymer. The intrinsic viscosity of this copolymer in toluene at 30°C was 0.88. The NMR, IR, and elemental analyses indicated for this copolymer to be 1:1 alternating copolymer wherein the butadiene unit is bonded in more than 85 percent of trans-1,4 form.

EXAMPLE 87

Except that vanadyl tribromide was used instead of vanadyl trichloride and polymerization was carried out at 0°C, the treatments were effected in the same manner as described in Example 83 to obtain 2.5 g of rubbery elastic copolymer. The intrinsic viscosity of this copolymer in dimethylformamide at 30°C was 1.82. The NMR, IR, and elemental analyses indicated that this copolymer is the same as that in Example 83.

EXAMPLE 88

Except that tetrachloroethane was used instead of tetrachloroethylene, the treatments were effected in the same manner as described in Example 1 to obtain 3.5 g of rubbery elastic copolymer. The intrinsic viscosity of this copolymer in dimethylformamide was 1.84. The NMR, IR, and elemental analyses indicated for this copolymer to be the same as that in Example 1.

EXAMPLE 89

Except that ethylaluminum sesquibromide was used instead of ethylaluminum dichloride, the treatments were effected in the same manner as described in Example 1 to obtain 1.7 g of elastic copolymer. The intrinsic viscosity in dimethylformamide at 30°C was 1.52. The NMR, IR, and elemental analyses indicated for this coplymer to be the same as that in Example 1.

EXAMPLE 90

Except that a mixture of triethylaluminum and aluminum tribromide of molar ratio 1:2 was used instead of ethylaluminum alone, the treatments were effected in the same manner as described in Example 1 to obtain 1.7 g of elastic copolymer. The intrinsic viscosity of this copolymer in dimethylformamide at 30°C was 1.27. The NMR, IR, and elemental analyses indicated for this copolymer to be the same as that in Example 1.

EXAMPLE 91

Except that a mixture of ethylaluminum dichloride and aluminum tribromide of molar ratio 2:1 was used instead of ethylaluminum dichloride alone, the treatments were effected in the same manner as described in Example 1 to obtain 3.5 g of elastic copolymer. The intrinsic viscosity of this copolymer in dimethylformamide was 1.73. The NMR, IR, and elemental analyses indicated that this copolymer is the same as that in Example 1.

What is claimed is:

1. A method of producing alternating copoloymers of conjugated dienes and cojugated polar vinyl monomers, wherein the conjugated diene unit and the conjugated polar vinyl monomer unit are bonded alternately, which comprises copolymerizing a conjugated diene having 4 to 10 carbon atoms and a conjugated polar vinyl monomer selected from the group consisting of methyl acrylate, ethyl acrylate, propyl acrylate, butyl acrylate, methyl methacrylate, and ethyl methacrylate, the molar ratio of said conjugated diene to said polar vinyl monomer being 1:10 to 10:1, at a temperature of −78°C to 50°C, under the monomer gas with or without an inert gas, at a pressure from one determined by vapor pressure in the reaction system to 50 atm., in a non-aqueous medium in the presence of a catalyst prepared from a component (A): at least one transition metal compound soluble in the monomer solution selected from the group consisting of halides, alcoxides, acetylacetonates, and salts of carboxylic acids of metals and oxy-metals of the Group IV–b and V–b in the Periodic Table and a component (B): an aluminum-containing component selected from the group consisting of aluminum compounds having the general formulae $R_2AlX$, $R_3Al_2X_3$, and $RAlX_2$ and a combination of two or more aluminum compounds having the general formulae $R_2AlX$, $R_3Al_2X_3$, $RAlX_2$, $R_3Al$, and $AlX_3$ wherein R represents a hydrocarbon radical selected from the group consisting of alkyl radicals having 1 to 10 carbon atoms and X represents a halogen radical selected from the group consisting to Cl and Br atoms, and wherein the ratio of the total number of the hydrocarbon radicals to the total number of halogen atoms in said aluminum-containing component is a positive number not greater than 2.0, and R and X in the aluminum compounds constituting said component (B) may be the same or different, said catalyst being prepared at a temperature of −100°C to 20°C, after complexing at least one of the components (A) and (B) with a basic organic compound selected from the group consisting of organic nitriles, $\alpha,\beta$-unsaturated carboxylic acid esters, benzoates, phenyl alkyl tertiary amines and thiophene avoiding direct contact of the conponents (A) with (B), the transition metal atom in the component (A) being $1:10^5$ to 1:1 g-atom based on a 1 g-atom of Al in the component (B), the total amount of metal atoms in the components (A) and (B) being $1:10^4$ to 1:10 g-atom based on 1 mole of the total amount of fed monomers.

2. The method as claimed in claim 1, wherein butadiene and methyl acrylate are copolymerized.

3. The method as claimed in claim 1, wherein butadiene and methyl methacrylate are copolymerized.

4. The method as claimed in claim 1, wherein the component (A) is compounds of vanadium and titanium, soluble in the mixed monomer solution.

5.. The method as claimed in claim 1, wherein the component (A) is vanadium compound soluble in the mixed monomer solution.

6. The method as claimed in claim 1, wherein the component (A) is vanadyl trichloride.

7. The method as claimed in claim 1, wherein the component (A) is a compound selected from the group consisting of vanadyl tribromide, vanadyl diacetylacetonate, tri-tert-butoxy vanadyl, di-tert-butoxy vanadyl chloride, tert-butoxy vanadyl dichloride, and vanadyl naphthenate.

8. The method as claimed in claim 1, wherein the component (B) is the compounds having the following formulae, $RAlCl_2$ and $R_3Al_2Br_3$ wherein R is an alkyl radical having 1 to 4 carbon atoms.

9. The method as claimed in claim 1, wherein the component (B) is ethylaluminum dichloride.

10. The method as claimed in claim 1, wherein the component (B) is an aluminum-containing compound selected from the group consisting of ethylaluminum sesquichloride, methylaluminum sesquichloride, ethylaluminum sesquibromide, and isobutylaluminum sesquibromide.

11. The method as claimed in claim 1, wherein the component (B) is a combination selected from the group consisting of triethylaluminum/aluminum trichloride, diethylaluminum chloride/aluminum trichloride, ethylaluminum dichloride/aluminum trichloride, ethylaluminum sesquichloride/ethylaluminum dichloride, triethylaluminum/aluminum tribromide, and ethyl-aluminum dichloride/aluminum tribromide.

12. The method as claimed in claim 1, wherein said basic organic compound is dimethyl aniline.

13. The method as claimed in claim 1, wherein the copolymerization is effected in the absence of solvent.

14. The method as claimed in claim 1, wherein the copolymerization is effected in carbon disulfide as a solvent.

15. The method as claimed in claim 1, wherein the copolymerization is effected in tetrachloroethane as a solvent.

16. The method as claimed in claim 1, wherein the copolymerization is effected in ethylene as a solvent.

17. The method as claimed in claim 1, wherein the transition metal atom in the component (A) is 1:200 to 1:3 g-atom based on 1 g-atom of Al in the component (B).

* * * * *